United States Patent
Pham Van et al.

(10) Patent No.: US 11,671,595 B2
(45) Date of Patent: Jun. 6, 2023

(54) RECONSTRUCTION OF BLOCKS OF VIDEO DATA USING BLOCK SIZE RESTRICTION

(71) Applicant: QUALCOMM Incorporated, San Diego, CA (US)

(72) Inventors: Luong Pham Van, San Diego, CA (US); Geert Van der Auwera, Del Mar, CA (US); Adarsh Krishnan Ramasubramonian, Irvine, CA (US); Han Huang, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 147 days.

(21) Appl. No.: 16/813,508

(22) Filed: Mar. 9, 2020

(65) Prior Publication Data

US 2020/0296367 A1     Sep. 17, 2020

Related U.S. Application Data

(60) Provisional application No. 62/824,688, filed on Mar. 27, 2019, provisional application No. 62/817,457, filed on Mar. 12, 2019.

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/176* (2014.11); *H04N 19/186* (2014.11); *H04N 19/96* (2014.11)

(58) Field of Classification Search
CPC .. H04N 19/119; H04N 19/176; H04N 19/186; H04N 19/96
See application file for complete search history.

(56) References Cited

U.S. PATENT DOCUMENTS

2017/0353719 A1* 12/2017 Liu ..................... H04N 19/156
2018/0367818 A1   12/2018 Liu et al.
(Continued)

FOREIGN PATENT DOCUMENTS

WO       2019026807 A1      2/2019

OTHER PUBLICATIONS

Bross et al., "Versatile Video Coding (Draft 5)", Joint Video Experts Team (JVET) of ITU-T SG 16 WP 3 and ISO/EC14 UTC 1/5C 29/WG 11, 14th Meeting: Geneva, CH, Mar. 19-27, 2019, JVET-N1001-V8, 399 Pages.

(Continued)

*Primary Examiner* — Jae N Noh
(74) *Attorney, Agent, or Firm* — Shumaker & Sieffert, P.A.

(57) ABSTRACT

A method of decoding video data includes determining, by one or more processors implemented in circuitry, a partition of the video data into a plurality of blocks. The partition of the video data applies a block size restriction to prevent a splitting of a block of the plurality of blocks that would result in a small block comprising a block width and a block height when the block height times the block width is less than a threshold. The method further includes generating, by the one or more processors, prediction information for the block and determining, by the one or more processors, a predicted block for the block based on the prediction information. The method further includes decoding, by the one or more processors, a residual block for the block and com- (Continued)

bining, by the one or more processors, the predicted block and the residual block to decode the block.

12 Claims, 17 Drawing Sheets

(51) Int. Cl.
*H04N 19/186* (2014.01)
*H04N 19/96* (2014.01)

(56) References Cited

U.S. PATENT DOCUMENTS

| | | | |
|---|---|---|---|
| 2020/0359048 A1* | 11/2020 | Abe | H04N 19/119 |
| 2020/0404283 A1* | 12/2020 | Pham Van | H04N 19/136 |
| 2021/0092372 A1* | 3/2021 | Misra | H04N 19/186 |
| 2021/0321114 A1* | 10/2021 | Hannuksela | G06F 16/50 |

OTHER PUBLICATIONS

Van L., et al., "CE3-2.2: Enabling Parallel Reconstruction of Small intra-coded Chroma Blocks", JVET-O0118, Joint Video Experts Team (JVET) of ITU-T SG 16 WP 3 and ISO/IEC JTC 1/SC 29/WG 11, 15th Meeting: Gothenburg, SE, Jul. 3-12, 2019, Doc: JVET-O0118-v2, pp. 1-3.
Van L., et al., "CE3-related: Enabling Parallel Reconstruction of Small intra-coded Chroma blocks", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0396-v2, pp. 1-4.
Bossen F., et al., "Non-CE3: A Unified Luma Intra Mode list Construction Process", Joint Video Experts Team (JVET) of ITU-T SG 16 WP 3 and ISO/IEC JTC 1/SC 29/WG 11, Document: JVET-M0528-r1, 13th Meeting: Marrakech, MA, Jan. 9-18, 2019, pp. 1-4.
Bross B., et al., "Versatile Video Coding (Draft 3)", JVET-L1001-V1, Joint Video Experts Team (JVET) of ITU-T SG 16 WP 3 and ISO/IEC JTC 1/SC 29/WG 11, 12th Meeting: Macao, CN, Oct. 3-12, 2018, 165 Pages.
Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-V5, 287 pages.
Bross B., et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q2001-vA, 519 Pages.
Chen J., et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.
Chen J., et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, JVET-L1002-v2, 12th Meeting: Macao, CN, Oct. 3-12, 2018, Doc: JVET-L1002, 48 pages.
Chen J., et al., "Algorithm Description for Versatile Video Coding and Test Model 4 (VTM 4)", Joint Video Experts Team (JVET) of ITU-T SG 16 WP 3 and ISO/IEC JTC 1/SC 29/WG 11, JVET-M1002-V2, 13th Meeting: Marrakech, MA, Jan. 9-18, 2019, pp. 1-63.
Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16); URL: http://phenix.int-evry.Fr/jvet/ No. JVET-A1001 Feb. 24, 2016 (Feb. 24, 2016), XP030150000, 27 pages.
Ergen S., "ZigBee/IEEE 802.15.4 Summary", Sep. 10, 2004, 37 Pages.
IEEE Std 802.11 ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
"Information technology—Dynamic Adaptive Streaming over HTTP {Dash)—Part 1: Media Presentation Description and Segment Formats," ISO/IEC 23009-1, International Standard, Draft third edition, Jan. 9, 2017, 216 pp.
International Search Report and Written Opinion—PCT/US2020/099388—ISA/EPO—Jun. 5, 2020 (13 pp).
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.
ITU-T H.265, "Series H: Audiovisual and Multimedia Systems, Infrastructure of Audiovisual Services—Coding of Moving Video, High efficiency Video Coding," The International Telecommunication Union Dec. 2016, 664 Pages.
Lin Z., et al., "CE3-related: Shared Reference Samples for Multiple Chroma intra CBs", Joint Video Experts Team (JVET) of ITU-T SG 16 WP 3 and ISO/IEC JTC 1/SC 29/WG 11, Doc: JVET-M0169-V1, 13th Meeting: Marrakesh, MA, Jan. 9-18, 2019, JVET-M0169-v2, pp. 1-4.
Ohm J-R., et al., "MPEG-4 Advanced Video Coding", MPEG Doc#: N7314, Jul. 2005, 11 Pages.
Yao S., et al., "Non-CE3: Intra Prediction Information Coding", Joint Video Experts Team (JVET) of ITU-T SG 16 WP 3 and ISO/IEC JTC 1/SC 29/WG 11, Document: JVET-M0210-V3, 13th Meeting: Marrakech, MA, Jan. 9-18, 2019, JVET-M0210-r2, pp. 1-7.
Zhou T., et al., "Non-CE3: Intra Chroma Partitioning and Prediction Restriction", Joint Video Experts Team (JVET) of ITU-T SG 16 WP 3 and ISO/IEC JTC 1/SC 29/WG 11, Doc: JVET-M0065,13th Meeting: Marrakesh, MA, Jan. 9-18, 2019, JVET-M0065, pp. 1-4.
An J., et al., "Block Partitioning Structure for Next Generation Video Coding", MPEG doc. m37524 and ITU-T SG16 Doc. COM16-C966, Oct. 2015.

* cited by examiner

RECONSTRUCTION OF BLOCKS OF VIDEO DATA USING BLOCK SIZE RESTRICTION

This application claims the benefit of U.S. Provisional Application No. 62/817,457, filed Mar. 12, 2019 and U.S. Provisional Application No. 62/824,688, filed Mar. 27, 2019, each of which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for processing blocks of video data (e.g., small intra-coded blocks). In examples of the disclosure, a video encoder may be configured to partition video data into a plurality of blocks. For example, rather than processing a large block of 64×64 samples (e.g., pixels), the video encoder may split a block into two or more smaller blocks, such as, for example, four 32×32 blocks, sixteen 16×16 blocks, or other block sizes. In some examples, the video encoder may be configured to split blocks into relatively small sizes (e.g., 2×2 blocks, 2×4 blocks, 4×2 blocks, etc.). Similarly, a video decoder may be configured to determine a partition of the video data into the plurality of blocks.

In accordance with example techniques of the disclosure, a video coder (e.g., a video encoder or a video decoder) may apply a block size restriction to prevent a split that leads to relatively small block sizes. That is, during a partitioning of video data that splits large blocks of video data into smaller blocks, the block size restriction may prevent one or more splits that would lead to relatively small block sizes. For example, the video coder may be configured to apply a block size restriction to prevent a splitting of a block that would result in a small block comprising a block width (in samples) and a block height (in samples) when the block height times the block width is less than a threshold number of samples (e.g., 16 samples). After partitioning the video data, the video coder may generate prediction information for the block and determine a predicted block for the block based on the predicted information. A predicted block may be dependent on neighboring blocks. For example, the video coder may determine a predicted block for a current block based on a top neighboring block and a left neighboring block. By preventing splits that lead to relatively small block sizes, the video coder may determine the prediction information of blocks of a slice of video data with fewer block dependencies, thus potentially decreasing coding complexity with little to no loss in prediction accuracy.

In one example, a method of decoding video data includes: determining, by one or more processors implemented in circuitry, a partition of the video data into a plurality of blocks, wherein the partition of the video data applies a block size restriction to prevent a splitting of a block of the plurality of blocks that would result in a small block comprising a block width and a block height when the block height times the block width is less than a threshold; generating, by the one or more processors, prediction information for the block; determining, by the one or more processors, a predicted block for the block based on the prediction information; decoding, by the one or more processors, a residual block for the block; and combining, by the one or more processors, the predicted block and the residual block to decode the block.

In another example, a method of encoding video data includes: partitioning, by one or more processors implemented in circuitry, the video data into a plurality of blocks, wherein, to partition, the one or more processors are configured to apply a block size restriction to prevent a splitting of a block of the plurality of blocks that would result in a small block comprising a block width and a block height when the block height times the block width is less than a threshold; generating, by the one or more processors, prediction information for the block; determining, by the one or more processors, a predicted block for the block based on the prediction information; generating, by the one or more processors, a residual block for the block based on differences between the block and the predicted block; and encoding, by the one or more processors, the residual block.

In one example, a device for decoding video data includes a memory configured to store video data and one or more processors implemented in circuitry and configured to: determine a partition of the video data into a plurality of blocks, wherein the partition of the video data applies a block size restriction to prevent a splitting of a block of the plurality of blocks that would result in a small block comprising a block width and a block height when the block height times the block width is less than a threshold; generate prediction information for the block; determine a predicted block for the block based on the prediction information; decode a residual block for the block; and combine the predicted block and the residual block to decode the block.

In another example, a device for encoding video data includes a memory configured to store video data and one or more processors implemented in circuitry and configured to: partition the video data into a plurality of blocks, wherein the partitioning comprises applying a block size restriction to prevent a splitting of a block of the plurality of blocks that would result in a small block comprising a block width and a block height when the block height times the block width is less than a threshold; generate prediction information for the block; determine a predicted block for the block based on the prediction information; generate a residual block for the block based on differences between the block and the predicted block; and encode the residual block.

In one example, a non-transitory computer-readable storage medium stores instructions that, when executed, cause one or more processors of a device to: determine a partition of the video data into a plurality of blocks, wherein the partition of the video data applies a block size restriction to prevent a splitting of a block of the plurality of blocks that would result in a small block comprising a block width and a block height when the block height times the block width is less than a threshold; generate prediction information for the block; determine a predicted block for the block based on the prediction information; decode a residual block for the block; and combine the predicted block and the residual block to decode the block.

In another example, a non-transitory computer-readable storage medium stores instructions that, when executed, cause one or more processors of a device to: partition the video data into a plurality of blocks, wherein the instructions that cause the one or more processors to partition cause the one or more processors to apply a block size restriction to prevent a splitting of a block of the plurality of blocks that would result in a small block comprising a block width and a block height when the block height times the block width is less than a threshold; generate prediction information for the block; determine a predicted block for the block based on the prediction information; generate a residual block for the block based on differences between the block and the predicted block; and encode the residual block.

In one example, an apparatus configured to decode video data comprises: means for determining a partition of the video data into a plurality of blocks, wherein the partition of the video data applies a block size restriction to prevent a splitting of a block of the plurality of blocks that would result in a small block comprising a block width and a block height when the block height times the block width is less than a threshold; means for generating prediction information for the block; means for determining a predicted block for the block based on the prediction information; means for decoding a residual block for the block; and means for combining the predicted block and the residual block to decode the block.

In another example, an apparatus configured to encode video data comprises: means for partitioning the video data into a plurality of blocks, wherein the means for partitioning comprises means for applying a block size restriction to prevent a splitting of a block of the plurality of blocks that would result in a small block comprising a block width and a block height when the block height times the block width is less than a threshold; means for generating prediction information for the block; means for determining a predicted block for the block based on the prediction information; means for generating a residual block for the block based on differences between the block and the predicted block; and means for encoding the residual block.

The details of one or more examples are set forth in the accompanying drawings and the description below. Other features, objects, and advantages will be apparent from the description, drawings, and claims.

DETAILED DESCRIPTION

Figure 1:
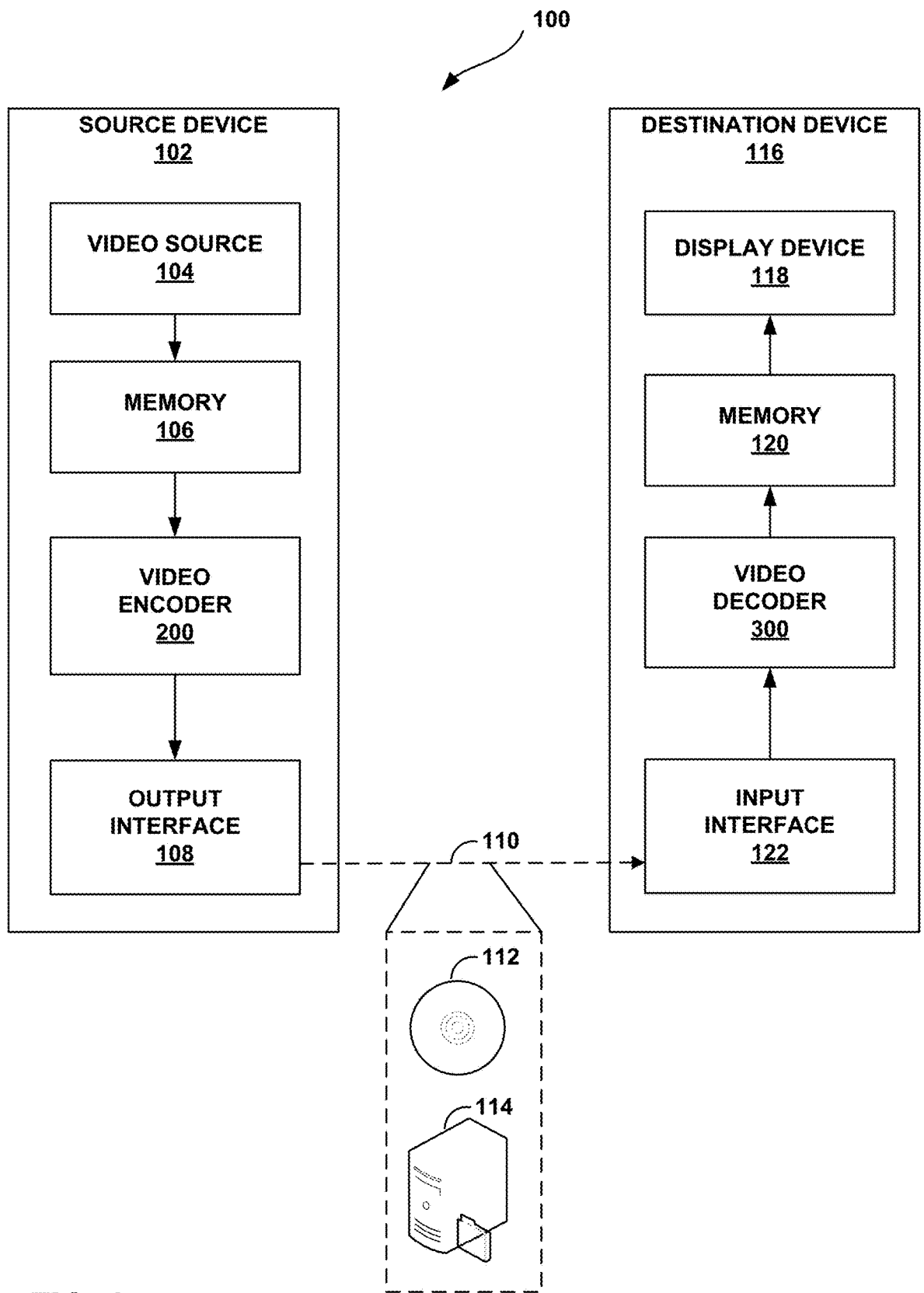
FIG. 1 is a block diagram illustrating an example video encoding and decoding system that may perform the techniques of this disclosure.

In general, this disclosure describes techniques for processing blocks of video data (e.g., intra-coded blocks). In examples of the disclosure, a video encoder may be configured to partition video data into a plurality of blocks. For example, rather than processing a large block of 64×64 samples, the video encoder may split a block into two smaller blocks, such as, for example, four 32×32 blocks, sixteen 16×16 blocks, or other block sizes. In some examples, the video encoder may be configured to split blocks into relatively small sizes (e.g., 2×2 blocks, 2×4 blocks, 4×2 blocks, etc.). For example, the video encoder may split a 16×8 block into two 8×8 blocks. Similarly, a video decoder may determine the partition of video data into the plurality of blocks. Rather than predicting the 16×8 block using motion information representing motion of all of the 128 samples (e.g., an average motion of the 128 samples), a video coder (e.g., video encoder or video decoder) may predict a first 8×8 block using first motion information representing motion of 64 samples and predict a second 8×8 block using second motion information representing motion of 64 samples, where the first motion information and the second motion information are different. In this way, partitioning a relatively large block into two (or more) relatively small sizes may improve coding accuracy.

To reduce a complexity of coding with little or no loss in coding accuracy, a video coder (e.g., a video encoder or video decoder) may be configured to represent a brightness of a block of video data using a luma component and color characteristics of the block of video data using chroma components. The chroma components may include a blue minus luma value ('Cb') and/or a red minus luma value ('Cr'). For example, a video coder (e.g., a video encoder or video decoder) may be configured to represent an 8×8 block by an 8×8 luma block (e.g., 'Y') of luma components, a first 4×4 chroma block (e.g., 'Cr') of chroma components and a second 4×4 chroma block (e.g., 'Cb') of chroma components. That is, the chroma components of a block of video data may be subsampled to have fewer samples than luma components of the block of video data. In this way, subsampling chroma components may improve a coding efficiency with little or no loss of coding accuracy.

A video coder (e.g., a video encoder or video decoder) may be configured to intra-code blocks where a predicted block is dependent on other blocks. For example, the video coder may predict a current block using a top neighboring block and a left neighboring block to improve a coding accuracy. As such, the video coder may not predict the current block in parallel with predicting the top neighboring block and a left neighboring block. Instead, the video coder may wait to predict the current block until completing a prediction of the top neighboring block and the left neighboring block. The block dependency may increase a coding complexity that increases with smaller block sizes.

In accordance with the techniques of the disclosure, a video coder (e.g., a video encoder or video decoder) may apply a block size restriction to prevent a split that leads to relatively small block sizes. As used herein, a split may refer to a partitioning of a block into smaller blocks. For example, the video coder may be configured to apply a block size restriction to prevent a splitting of a block that would result in a small block comprising a block width (in samples) and a block height (in samples) when the block height times the block width is less than a threshold number of samples (e.g., 16 samples). The video coder may apply the block size restriction to only chroma components of a block. In another example, the video coder may apply the block size restriction to chroma components of a block and to luma components of the block. Applying the block restriction may help to reduce a coding complexity from block dependencies while having no or little impact on coding accuracy.

After partitioning or splitting the video data, a video coder (e.g., a video encoder or video decoder) may generate prediction information for a block and determine a predicted block for the block based on the predicted information. Again, a predicted block may be dependent on neighboring blocks in the case of intra prediction. For example, the video coder may determine a predicted block for a current block based on a top neighboring block and a left neighboring block. By preventing splits that lead to relatively small block sizes, the video coder may determine the prediction information of blocks of a slice of video data with fewer block dependencies, thus potentially decreasing coding complexity with little to no loss in prediction accuracy.

FIG. 1 is a block diagram illustrating an example video encoding and decoding system 100 that may perform the techniques of this disclosure. Techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for processing small intra-coded blocks in parallel. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for processing small intra-coded blocks in parallel. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally, or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a file transfer protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, $17^{th}$ Meeting: Brussels, BE, 7-17 Jan. 2020, JVET-Q2001-vA (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data (e.g., luma components and/or chroma components). In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

To improve coding accuracy, a video coder (e.g., video encoder 200 or video decoder 300) may partition a block of data. For example, the video coder may partition a block using a quad-tree split, a binary split, or another split. The video coder may partition the block using a dual tree. For example, the video coder may partition chroma components of the block using a first tree (e.g., a chroma tree) and partition luma components of the block using a second tree (e.g., a luma tree) different than the first tree. The video coder may partition the block using a single tree.

A video coder (e.g., video encoder 200 or video decoder 300) may determine a single tree for video data (e.g., a slice of video data) based on luma components for the block. For example, a block may be represented by an 8×8 luma block (e.g., 'Y'), a first 4×4 chroma block (e.g., 'Cr') and a second 4×4 chroma block (e.g., 'Cb'). In this example, the video coder may generate the single tree to split the block such that the 8×8 luma block is split into two 4×4 luma blocks. The video coder may split the first 4×4 chroma block (e.g., 'Cr') into two 2×2 chroma blocks and split the second 4×4 chroma block (e.g., 'Cb') into two 2×2 chroma blocks according to the single tree. In this way, the video coder may improve accuracy of a resulting predicted block for the block, which may improve prediction accuracy of the video data.

However, when partitioning blocks of video data (e.g., intra-coded blocks), a video coder (e.g., video encoder 200 or video decoder 300) may split a block (e.g., chroma components of the block and/or luma components of the block) into small blocks (e.g., a 2×2 block, a 2×4 block, a 4×2 block, etc.). Moreover, each of the small blocks may have a coding dependency on neighboring blocks. For example, the video coder may determine a predicted block for each of the small blocks using samples of one or more neighboring blocks (e.g., a left neighbor block and/or a top neighbor block). As such, the small blocks along with the data dependencies may cause the video coder to sequentially determine a predicted block for each of the small blocks, which may result in higher coding complexity.

In accordance with example techniques of the disclosure, a video coder (e.g., video encoder 200 or video decoder 300) may be configured to apply a block size restriction to prevent a splitting of a block that would result in a small block. For example, the video coder may be configured to apply a block size restriction to prevent a splitting of a block that would result in a small block comprising a block width and a block height when the block height times the block width is less than a threshold number of samples (e.g., 4 samples, 16 samples, 32 samples, 64 samples, etc.). For instance, a video coder (e.g., video encoder 200 or video decoder 300) may be configured to prevent splitting of an 4×4 block, as such splitting would result in blocks that yield a product of a block height times block width is less than 16 samples.

A video coder (e.g., video encoder 200 or video decoder 300) may be configured to split luma components for a block of video data independently from splitting chroma components for the block of video data. For example, when preventing a splitting of a block (e.g., a 4×4 block), the video coder may prevent a splitting of one or more chroma blocks (e.g., 2×2 chroma blocks) for the block of video data and prevent a splitting of a luma block (e.g., a 4×4 luma block) for the block of video data. In some examples, however, the video coder may prevent a splitting of one or more chroma blocks (e.g., 2×2 chroma blocks) for the block of video data and split a luma block (e.g., a 4×4 luma block) for the block of video data when preventing a splitting of the 4×4 block. In particular, when the chroma blocks are subsampled relative to the luma block, spitting the chroma blocks may result in a height by width product that is less than a threshold number of samples but splitting the luma block may result in a height by width product that is not less than the threshold number of samples.

A video coder (e.g., video encoder 200 or video decoder 300) may be configured to split luma components for a block of video data and to split luma components for the block of video data using a block restriction with different thresholds for luma and chroma. For example, the video coder may be configured to apply a block size restriction to prevent a splitting of chroma components for a block that would result in a small chroma block comprising a block width and a block height when the block height times the block width is less than a first threshold. In this example, the video coder may be configured to apply the block size restriction to prevent a splitting of luma components for the block that would result in a small luma block comprising a block width and a block height when the block height times the block width is less than a second threshold that is different from the first threshold. In some examples, however, the first threshold and the second threshold may be the same.

A video coder (e.g., video encoder 200 or video decoder 300) may apply a block size restriction to chroma components for a block of video data independently from luma components for the block of video data in a single tree. For example, the video coder may determine a single tree for video data (e.g., a slice of video data) based on luma components for the block. For instance, a block may be represented by an 8×8 luma block (e.g., 'Y'), a first 4×4 chroma block (e.g., 'Cr') and a second 4×4 chroma block (e.g., 'Cb'). In this example, the video coder may generate the single tree to split the block. In response to the single tree indicating a splitting of the block, the video coder may split the luma block (e.g., an 4×4 luma block) into smaller luma blocks (e.g., two 2×4 luma blocks) according to the single tree. In response to the single tree indicating the splitting of the block, the video coder may apply a block size restriction to prevent a splitting of the chroma blocks for the block for video data. For instance, the video coder may refrain from splitting the first 2×2 chroma block (e.g., 'Cr') into two 2×1 chroma blocks and a splitting of the second 2×2 chroma block (e.g., 'Cb') into two 2×1 chroma blocks.

After partitioning the video data, a video coder (e.g., video encoder 200 or video decoder 300) may generate prediction information for a block and determine a predicted block for the block based on the predicted information. Again, a predicted block may be dependent on neighboring blocks. For example, the video coder may determine a predicted block for a current block based on a top neighboring block and a left neighboring block. By preventing block splits (e.g., chroma components and/or luma components) that lead to relatively small block sizes, the video coder may determine the prediction information of blocks of video data with fewer block dependencies, thus potentially decreasing coding complexity with little to no loss in prediction accuracy.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
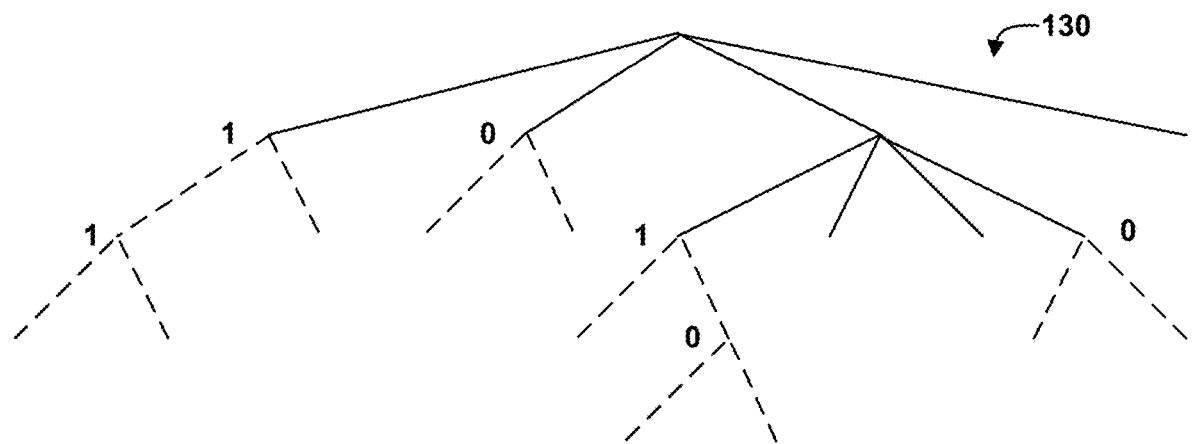
FIGS. 2A and 2B are conceptual diagrams illustrating an example quadtree binary tree (QTBT) structure and a corresponding coding tree unit (CTU).
Figure 2B:
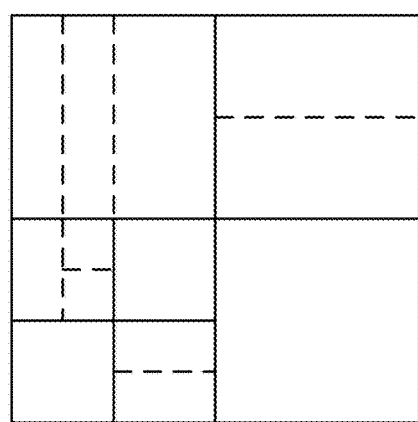

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level (i.e., a first level) of QTBT structure 130 (i.e., the solid lines) and syntax elements (such as splitting information) for a prediction tree level (i.e., a second level) of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, it will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs and are further processed according to prediction and transform without further partitioning.

Figure 3:
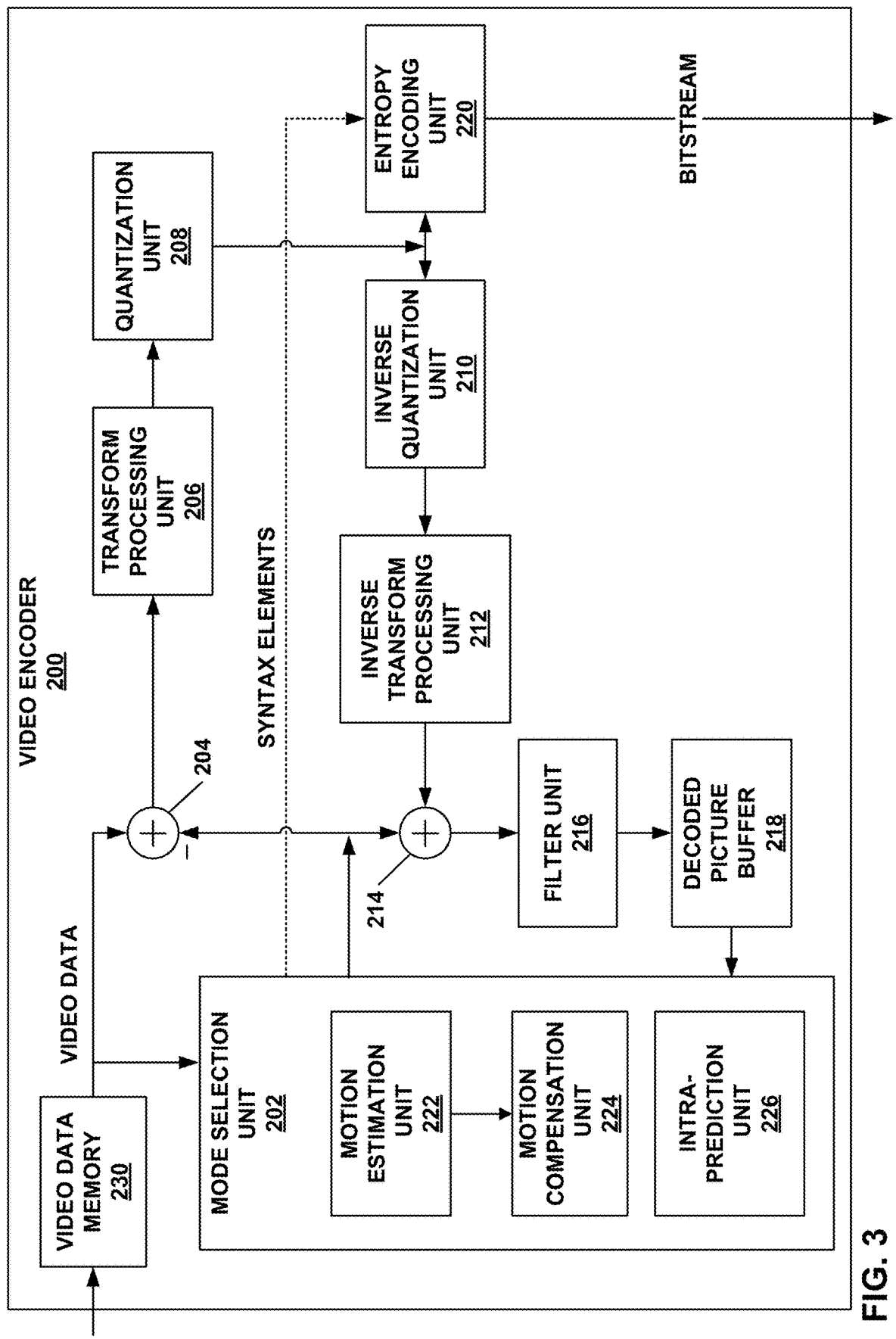
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 (VVC) video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar sizes for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

Mode selection unit 202 may apply a block size restriction. For example, mode selection unit 202 may be configured to apply a block size restriction to prevent a splitting of a block that would result in a small block comprising a block width and a block height when the block height times the block width is less than a threshold (e.g., 16 samples). In some examples, mode selection unit 202 may apply the block size restriction to only chroma components of a block. That is, mode selection unit 202 may apply the block size restriction to chroma components of a block and refrain from applying the block size restriction to luma components of the block. In this way, mode selection unit 202 may account for subsampling of the chroma components of a block, which may reduce a coding complexity with little or no loss in coding accuracy. For instance, mode selection unit 202 may apply a block size restriction to prevent a split of chroma components of a block partition according to a single tree and split luma components of the block. In some examples, mode selection unit 202 may apply the block size restriction to chroma components of a block and to luma components of the block. Applying the block restriction may help to reduce a coding complexity from block dependencies while having no or little impact on coding accuracy.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of an apparatus configured to encode video data including a memory (e.g., video data memory 230) configured to store video data, and one or more processors implemented in circuitry. Mode selection unit 202 may be configured to partition the video data into a plurality of blocks. To partition the video data, mode selection unit 202 may be configured to apply a block size restriction to prevent a splitting of a block of the plurality of blocks that would result in a small block comprising a block width and a block height when the block height times the block width is less than a threshold. Mode selection unit 202 may be configured to generate prediction information for the block resulting from the block size restriction. Mode selection unit 202 may be configured to determine a predicted block for the block based on the prediction information. Residual generation unit 204 may be configured to generate a residual block for the block based on differences between the block and the predicted block. Entropy encoding unit 220 may encode the residual block.

Figure 4:
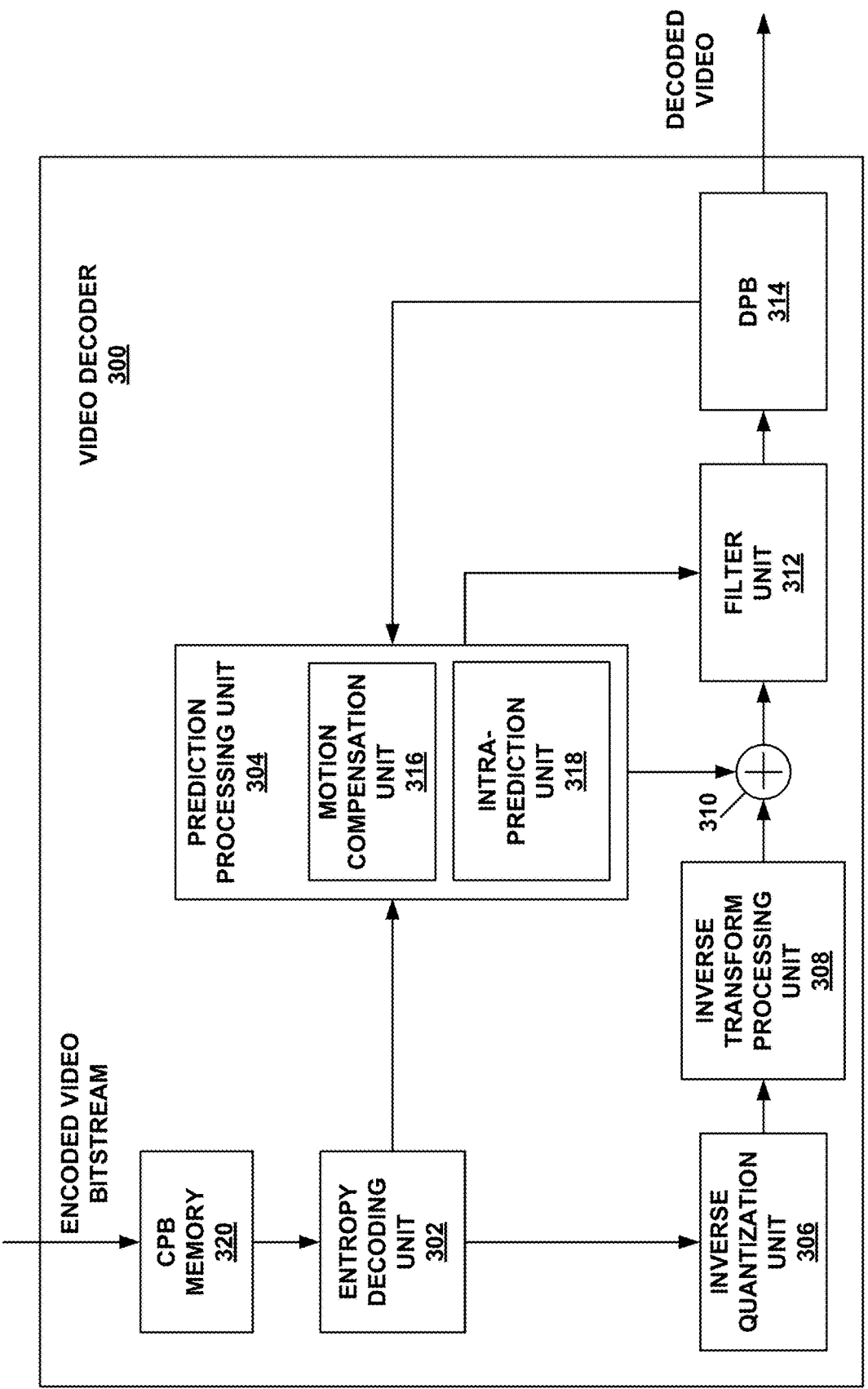
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements and residual data) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Prediction processing unit 304 may apply a block size restriction when splitting blocks. For example, prediction processing unit 304 may be configured to apply a block size restriction to prevent a splitting of a block that would result in a small block comprising a block width and a block height when the block height times the block width is less than a threshold (e.g., 16 samples). Prediction processing unit 304 may apply the block size restriction to only chroma components of a block, which may reduce a coding complexity with little or no loss in coding accuracy. That is, prediction processing unit 304 may apply the block size restriction to chroma components of a block and refrain from applying the block size restriction to luma components of the block. In this way, prediction processing unit 304 may account for subsampling of the chroma components of a block. For instance, prediction processing unit 304 may apply a block size restriction to prevent a split of chroma components of a block partition according to a single tree and split luma components of the block. In another example, prediction processing unit 304 may apply the block size restriction to chroma components of a block and to luma components of the block. Applying the block restriction may help to reduce a coding complexity from block dependencies while having no or little impact on coding accuracy.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3).

Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of an apparatus including a memory (e.g., video data memory 230) configured to store video data, and one or more processing units implemented in circuitry and configured to determine a plurality of intra-coded blocks for generating prediction information. Prediction processing unit 304 may be configured to determine a partition of the video data into a plurality of blocks, where the partition of the video data may apply a block size restriction to prevent a splitting of a block of the plurality of blocks that would result in a small block comprising a block width (in samples) and a block height (in samples) when the block height times the block width is less than a threshold number of samples. Prediction processing unit 304 may be configured to generate prediction information for the block. Prediction processing unit 304 may be configured to determine a predicted block for the block based on the prediction information. Entropy decoding unit 302 may be configured to decode a residual block for the block. Reconstruction unit 310 may be configured to combine the predicted block and the residual block to decode the block.

FIGS. 5A-5E illustrate examples of four splitting types in multi-type tree structure. In HEVC, a CTU is split into CUs by using a quaternary-tree structure denoted as coding tree to adapt to various local characteristics. The decision of whether to code a picture area using inter-picture (temporal) or intra-picture (spatial) prediction is made at the leaf CU level. Each leaf CU can be further split into one, two, or four PUs according to the PU splitting type. Inside one PU, the same prediction process is applied, and the relevant information is transmitted to the decoder on a PU basis. After obtaining the residual block by applying the prediction process based on the PU splitting type, a leaf CU can be partitioned into transform units (TUs) according to another quaternary-tree structure like the coding tree for the CU. A feature of the HEVC structure is that the HEVC structure has multiple partition concepts including CU, PU, and TU.

In VVC, a quadtree with nested multi-type tree using binary and ternary splits segmentation structure replaces the concepts of multiple partition unit types. That is, VVC removes the separation of the CU, PU and TU concepts of HEVC except as needed for CUs that have a size too large for the maximum transform length. As such, VVC may support more flexibility for CU partition shapes than HEVC. In the coding tree structure, a CU can have either a square or rectangular shape. A video coder (e.g., video encoder 200 or video decoder 300, or in some examples, mode selection unit 202 of video encoder 200 or prediction processing unit 304 of video decoder 300) first partitions a coding tree unit (CTU) by a quaternary tree (a.k.a. quadtree) structure. Then, the video coder further partitions the quaternary tree leaf nodes by a multi-type tree structure.

Figure 5A:
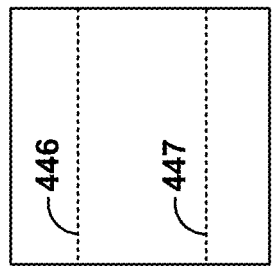
FIG. 5A is a conceptual diagram illustrating an example of quad-tree partitioning.
Figure 5B:
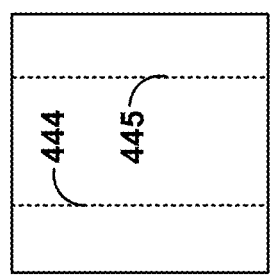
FIG. 5B is a conceptual diagram illustrating an example of vertical binary-tree partitioning.
Figure 5C:
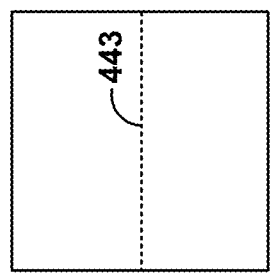
FIG. 5C is a conceptual diagram illustrating an example of horizontal binary-tree partitioning.
Figure 5D:
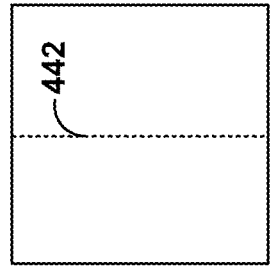
FIG. 5D is a conceptual diagram illustrating an example of vertical ternary-tree partitioning.
Figure 5E:
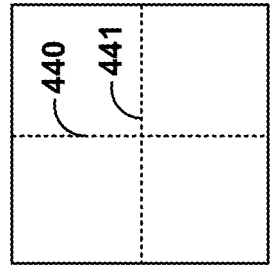
FIG. 5E is a conceptual diagram illustrating an example of horizontal ternary-tree partitioning.

FIG. 5A is a conceptual diagram illustrating an example of quad-tree partitioning including a vertical binary split 440 ("SPLIT_BT_VER") and a horizontal binary split 441 ("SPLIT_BT_HOR"). FIG. 5B is a conceptual diagram illustrating an example of vertical binary-tree partitioning including a vertical binary split 442. FIG. 5C is a conceptual diagram illustrating an example of horizontal binary-tree partitioning including a horizontal binary split 443. FIG. 5D is a conceptual diagram illustrating an example of vertical ternary-tree partitioning including vertical ternary splits 444, 445 ("SPLIT_TT_VER"). FIG. 5E is a conceptual diagram illustrating an example of horizontal ternary-tree partitioning including horizontal ternary splits 446, 447 ("SPLIT_TT_HOR"). The multi-type tree leaf nodes are called coding units (CUs), and unless the CU is too large for the maximum transform length, a video coder (e.g., video encoder 200 or video decoder 300, or in some examples, mode selection unit 202 of video encoder 200 or prediction processing unit 304 of video decoder 300) may use this segmentation for prediction and transform processing without any further partitioning. This means that, in most cases, the CU, PU and TU may have the same block size in the quadtree with nested multi-type tree coding block structure. The exception may occur when a maximum supported transform length is smaller than a width or height of a colour component of the CU.

In VVC, a CTU consists of a luma coding tree block (CTB) and two chroma coding tree blocks. At the CU level, a CU is associated with a luma coding block (CB) and two chroma coding blocks. As in VTM (the reference software of the VVC), the luma tree and the chroma tree are separated in intra slices (referred to as dual tree structure) while they are shared in inter slices (referred to as single tree or shared tree structure). The size of a CTU can be up to 128×128 (luma component) while the size of a coding unit may range from 4×4 to the size of CTU. In this scenario, the size of a chroma block can be 2×2, 2×4, or 4×2 in 4:2:0 color format. While examples described herein are directed to the 4:2:0 color format, which subsamples to half the resolution along a vertical direction and to half the resolution along a horizontal direction, other color formats (e.g., the 4:2:2 color format) may be used.

Figure 6:
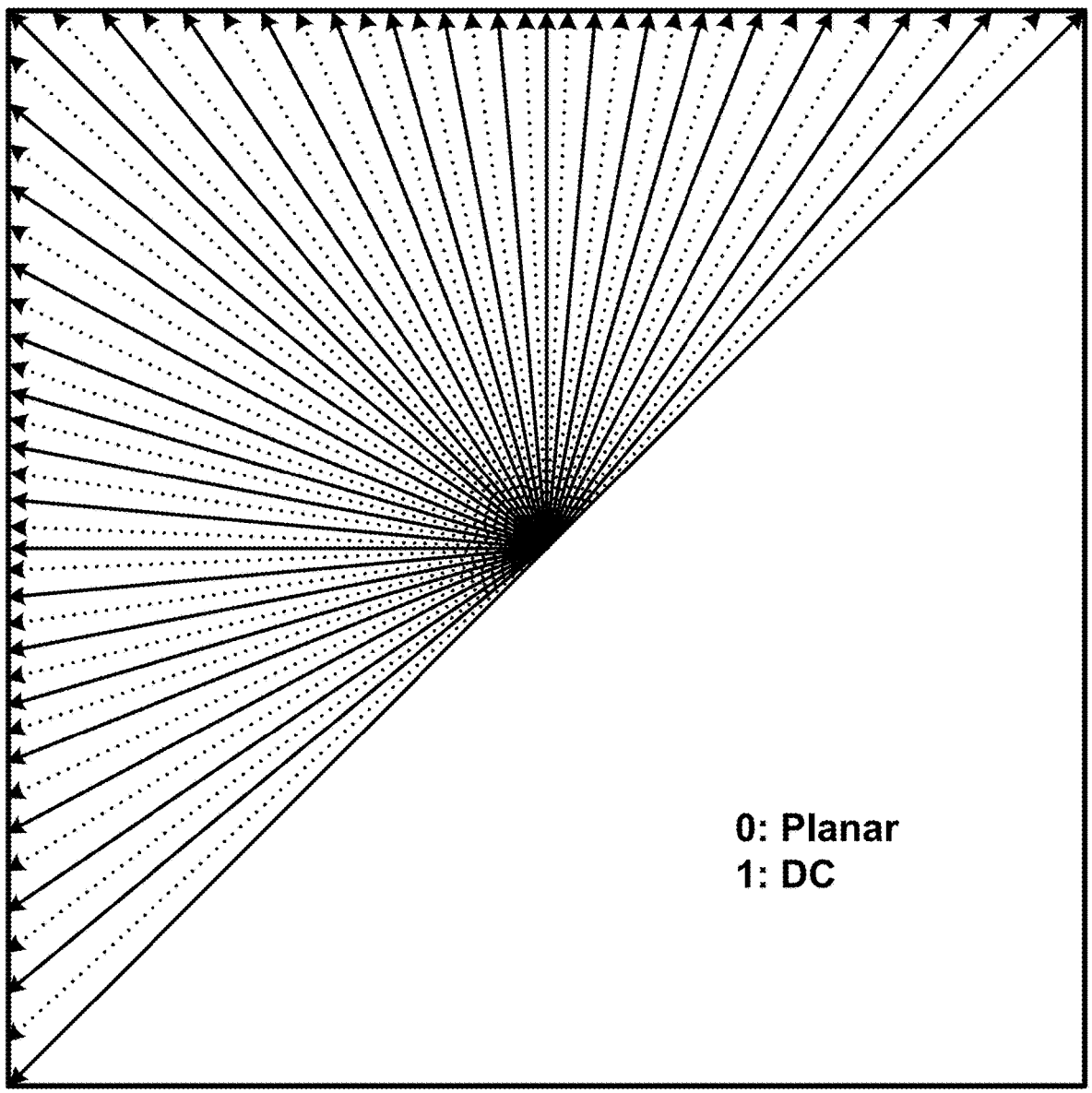
FIG. 6 is a conceptual diagram illustrating an example of directions of intra prediction.

FIG. 6 is a conceptual diagram illustrating directions of intra prediction, arrows points towards the reference samples. For the luma component, intra prediction involves DC, planar, and directional (or angular) prediction mode. Directional prediction for square blocks uses directions between −135 degrees to 45 degrees of the current block in the VVC test model 2 (VTM2), as depicted in FIG. 6.

In VTM2, a block structure used for specifying the prediction block for intra prediction is not restricted to be square (width w=height h). Rectangular or non-square prediction blocks (w>h or w<h) can increase the coding efficiency based on the characteristics of the content.

In such rectangular blocks, restricting a direction of intra prediction to be within −135 degrees to 45 degrees can result in situations where farther reference samples are used rather than closer reference samples for intra prediction. Such a design is likely to have an impact on the coding efficiency; it is more beneficial to have the range of restrictions relaxed so that closer reference samples (e.g., samples beyond the −135 to 45-degree angle) can be used for prediction. An example of such a case is given in FIG. 7.

Figure 7:
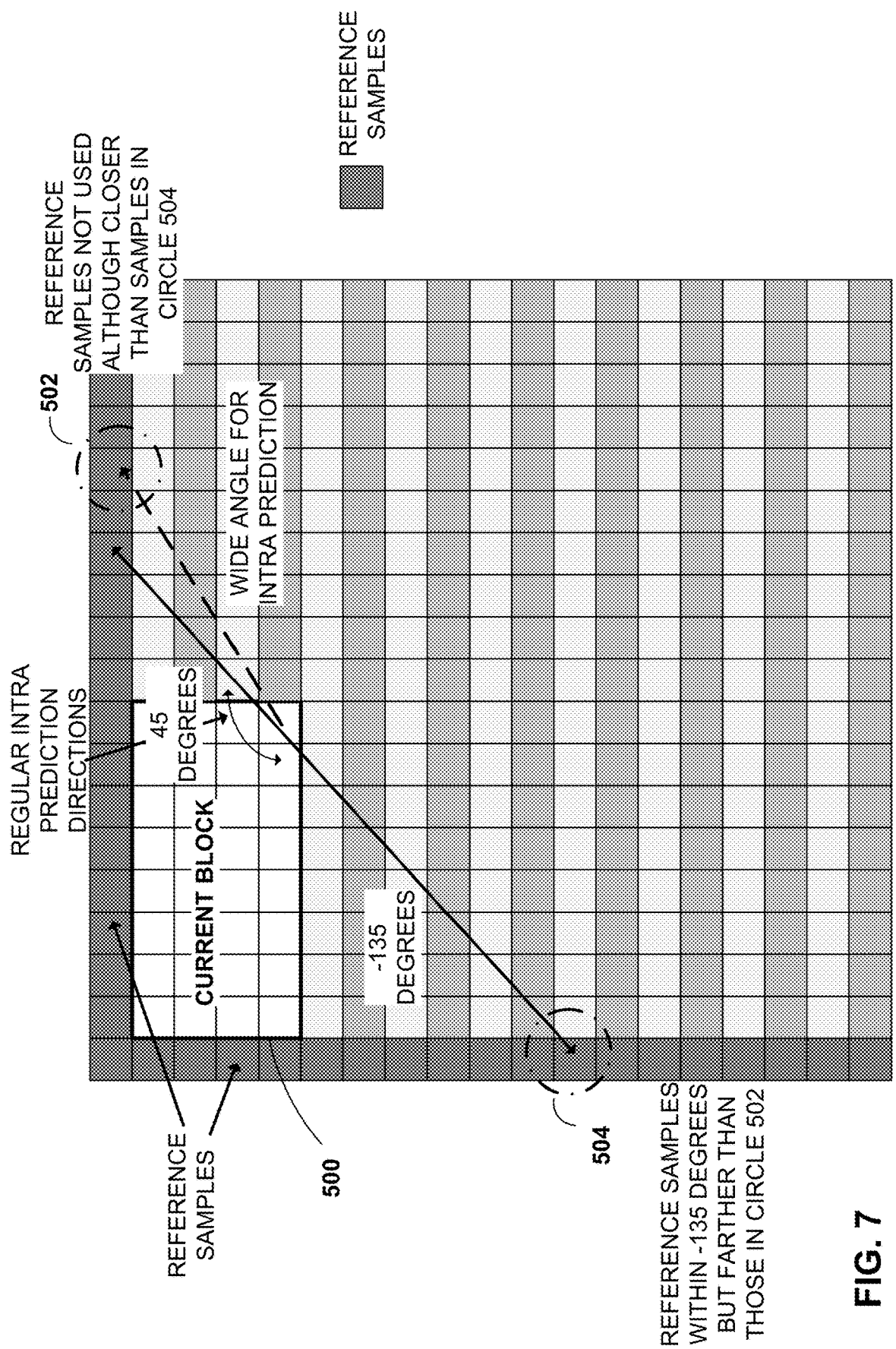
FIG. 7 is a conceptual diagram illustrating an example of an 8×4 rectangular block where closer reference samples are not used for prediction and farther reference samples may be used for prediction.
Figure 8A:
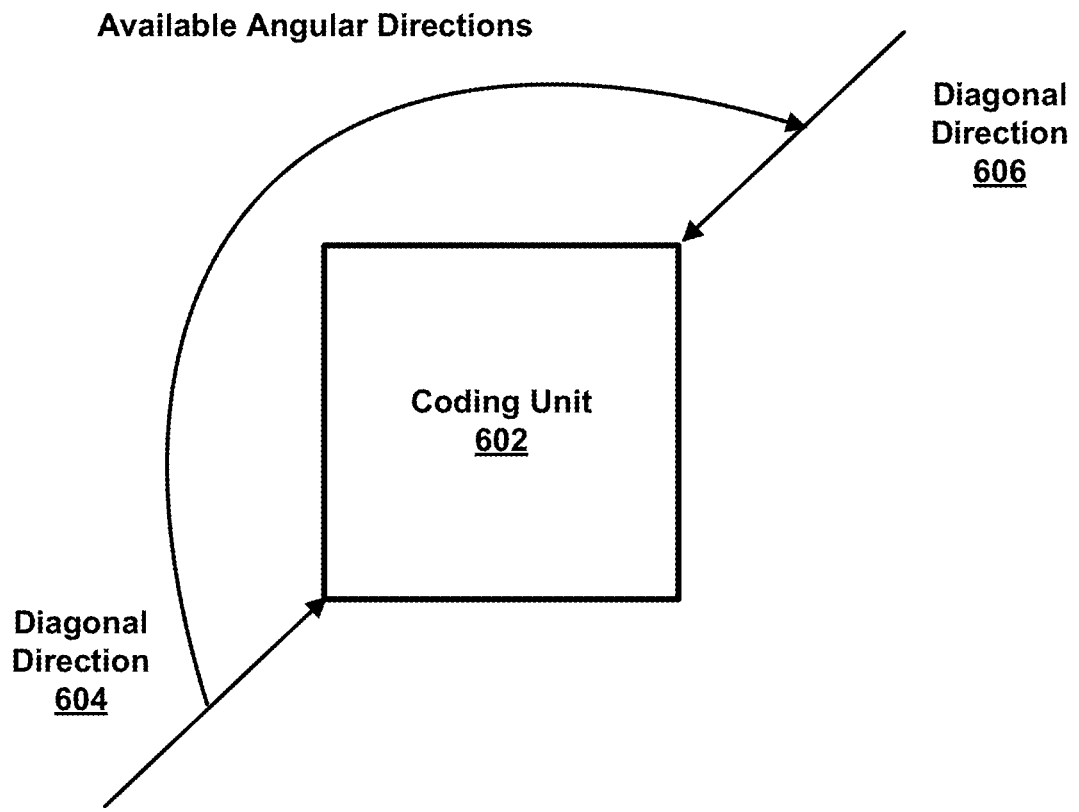
FIG. 8A is a conceptual diagram illustrating an example of a square block that does not use angular mode remapping.
Figure 8B:
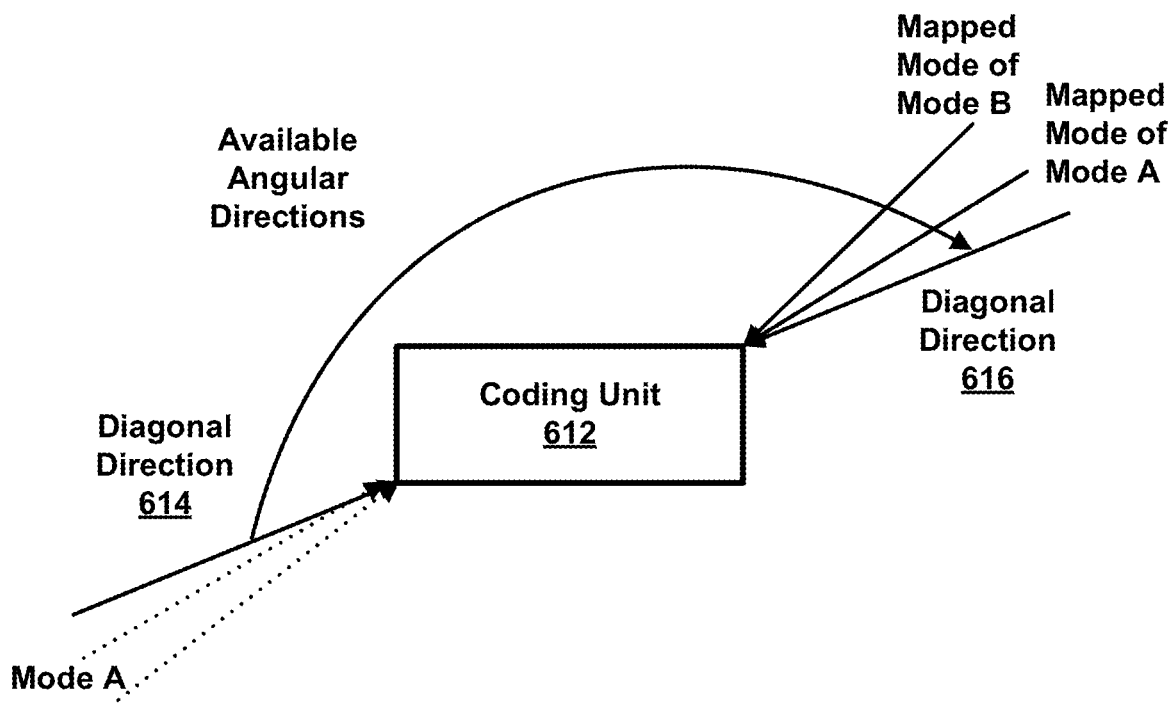
FIG. 8B is a conceptual diagram illustrating an example of an angular mode remapping for a horizontal non-square block.
Figure 8C:
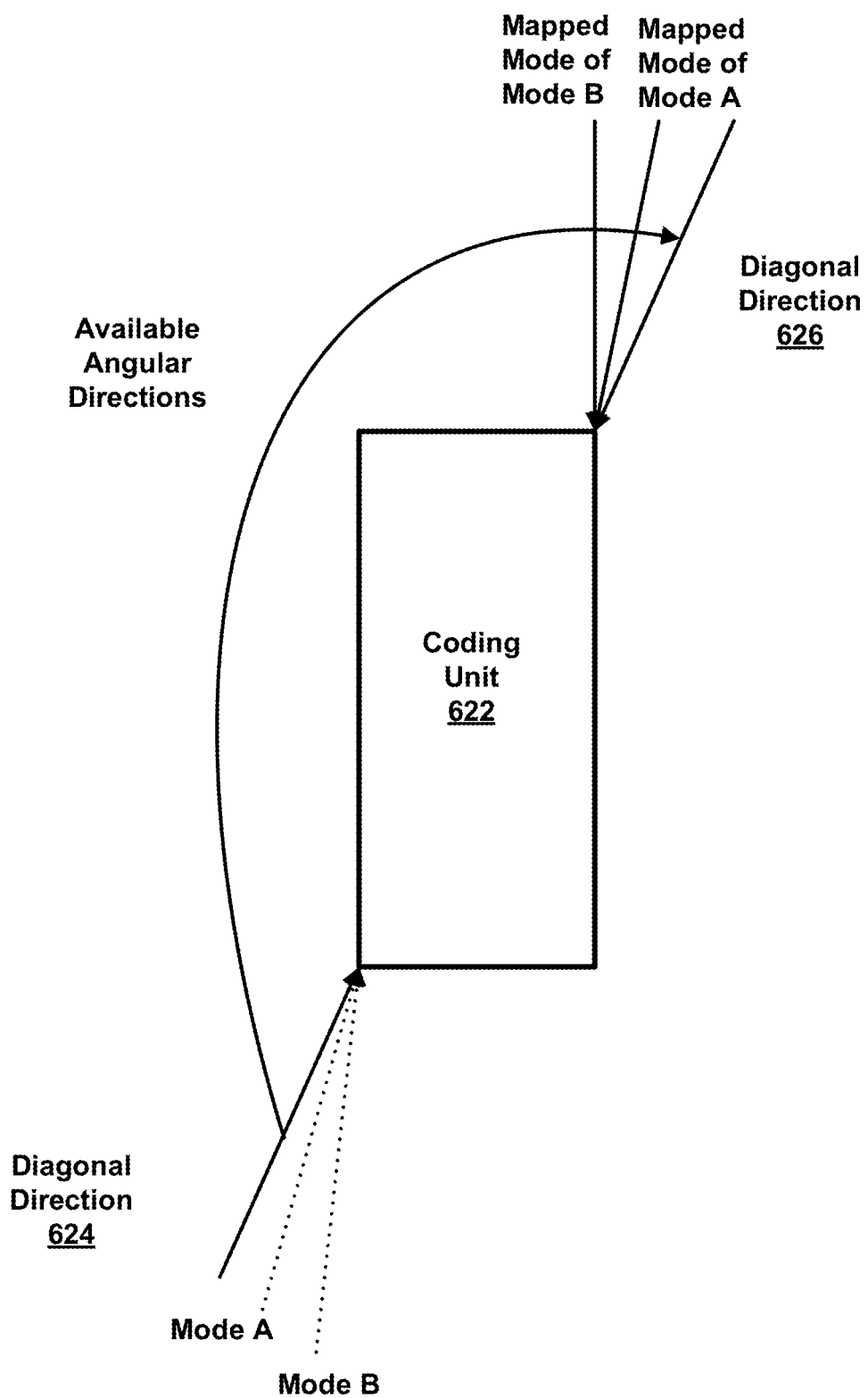
FIG. 8C is a conceptual diagram illustrating an example of angular mode remapping for a vertical non-square block.

FIG. 7 is a conceptual diagram illustrating an 8×4 rectangular block 500 where "closer" reference samples 502 (dashed arrows) are not used, but farther reference samples 504 (dashed circle) may be used, due to restriction of intra prediction direction to be in the range −135 degrees to 45 degrees. During the 12$^{th}$ JVET meeting, a modification of wide-angle intra prediction was adopted into VTM3. This adoption includes two modifications to unify the angular intra prediction for square and non-square blocks. Firstly, angular prediction directions are modified to cover diagonal directions of all block shapes. Secondly, all angular directions are kept within the range between the bottom-left diagonal direction and the top-right diagonal direction for all block aspect ratios (square and non-square) as illustrated in FIGS. 8A-8C. In addition, the number of reference samples in the top reference row and left reference column are restricted to 2*width+1 and 2*height+1 for all block shapes. An illustration of wider angles that are adopted in VTM3 is provided in FIG. 10. Although VTM3 defines 95 modes, for any block size only 67 modes are allowed. The exact modes that are allowed depend on the ratio of block width to height. This is done by restricting the mode range for certain block sizes.

FIGS. 8A-8C are conceptual diagrams illustrating an example of a mode mapping process for modes outside the diagonal direction range. Specifically, FIG. 8A is a conceptual diagram illustrating an example of a square block 602 with diagonal direction 604 and diagonal direction 606, which does not require angular mode remapping. FIG. 8B is a conceptual diagram illustrating an example of angular mode remapping for horizontal non-square block 612 with diagonal direction 614 and diagonal direction 616. FIG. 8C is a conceptual diagram illustrating an example of angular mode remapping for vertical non-square block 622 with diagonal direction 624 and diagonal direction 626.

Table 1 specifies a mapping table between predModeIntra and the angle parameter intraPredAngle in VTM3. Some of the angular modes correspond with non-square block diagonals. In the following, angular modes with a positive intraPredAngle value are referred to as positive angular modes (mode index<18 or >50), while angular modes with a negative intraPredAngle value are referred to as negative angular modes (mode index>18 and <50).

Figure 9:
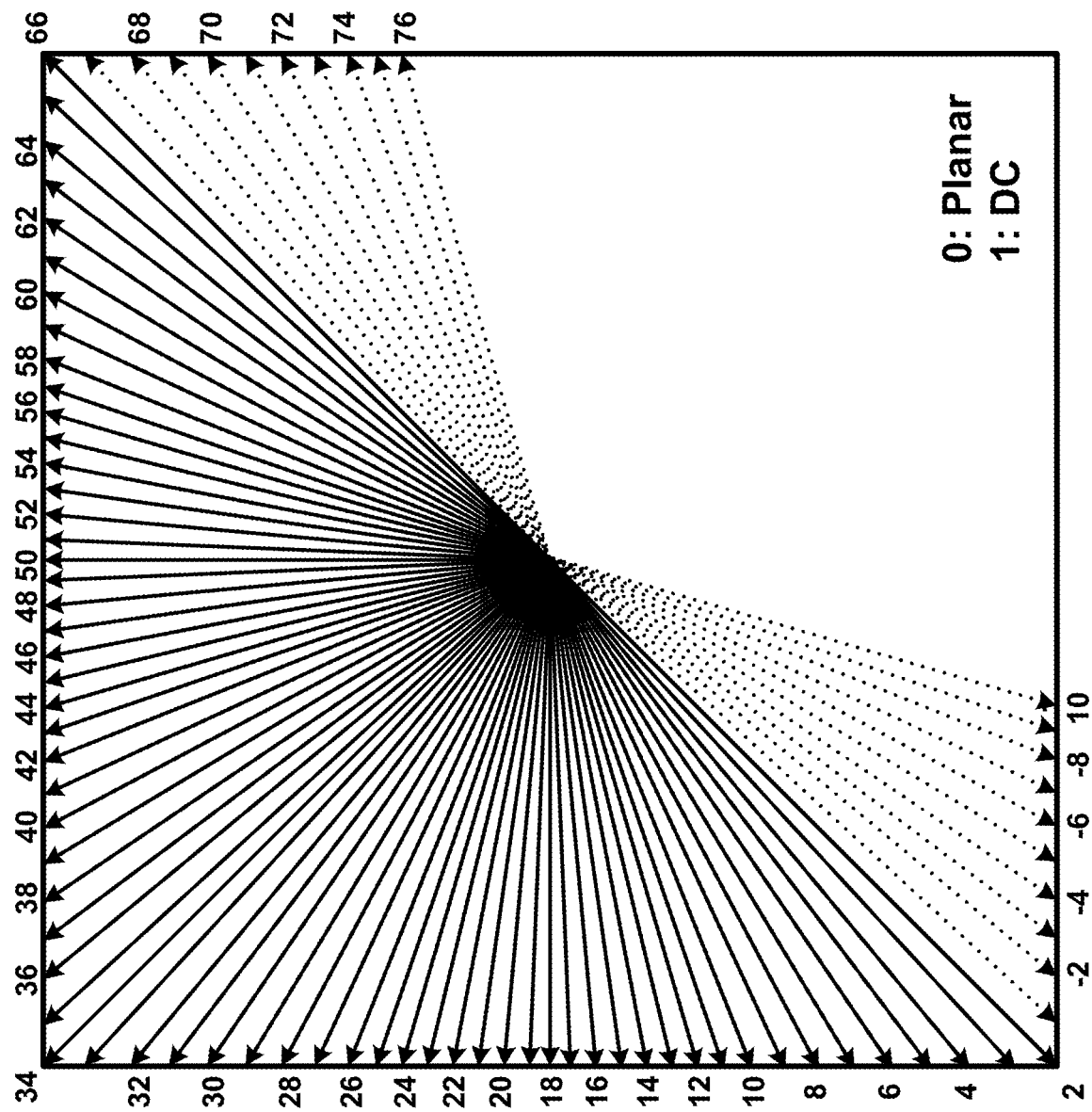
FIG. 9 is a conceptual diagram illustrating an example of wide angles (−1 to −10, and 67 to 76) depicted in addition to a base set of 65 angular modes.
Figure 10:
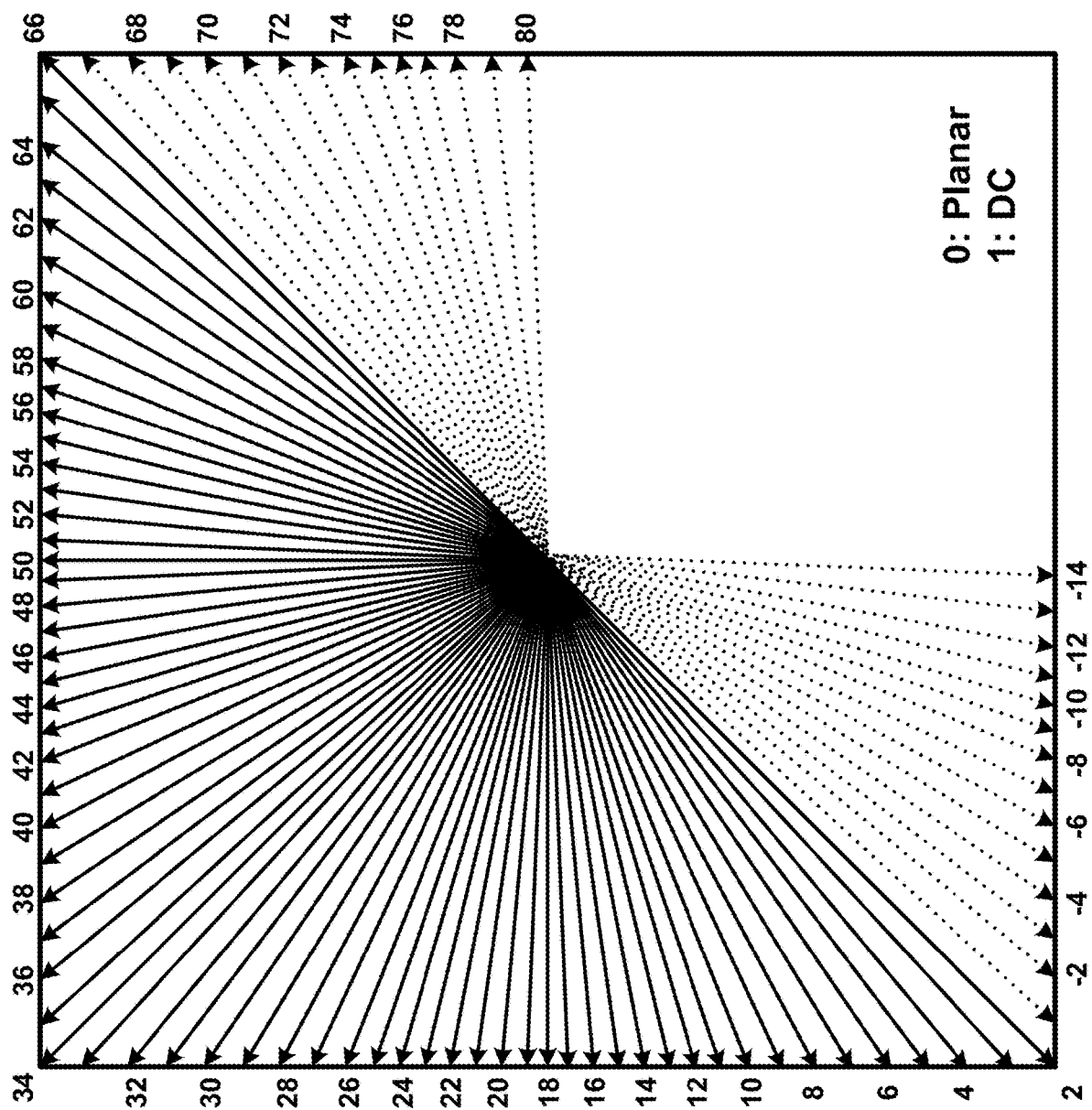
FIG. 10 is a conceptual diagram illustrating an example of wide angles (−1 to −14, and 67 to 80) in versatile video coding test model 3 (VTM3) beyond modes 2 and 66 for a total of 93 angular modes.

FIG. 9 is a conceptual diagram illustrating an example of wide angles (−1 to −10, and 67 to 76) depicted in addition to the 65 angular modes. FIG. 10 is a conceptual diagram illustrating an example of wide angles (−1 to −14, and 67 to 80) in VTM3 beyond modes 2 and 66 for a total of 93 angular modes.

Some designs of VVC support eight intra prediction modes for the chroma component, including PLANAR, vertical "VER", horizontal "HOR", DC, LM, multi-directional linear model 'L' (MDLM_L), MDLM_T, and derived mode (DM). In order to encode a chroma intra coded CU, a video encoder (e.g., video encoder 200) may use a flag to indicate whether this CU is DM coded or not. If the CU is decided to be DM coded, a video decoder (e.g., video decoder 300) may use the intra prediction mode of the corresponding luma component to get the prediction for this CU. Otherwise, the video encoder may signal the mode of the CU to the decoder. A video coder (e.g., video encoder 200 or video decoder 300) may reconstruct samples of the top neighboring block in the VER mode and may reconstruct samples of the left neighboring block in the HOR mode to predict the current block. The video coder may reconstruct samples of both the top and left neighboring blocks in the PLANAR and DC mode for prediction. The video coder may reconstruct samples of the corresponding luma blocks that are used for the prediction for the LM, MDLM_L, and MDLM_T modes.

Figure 11:
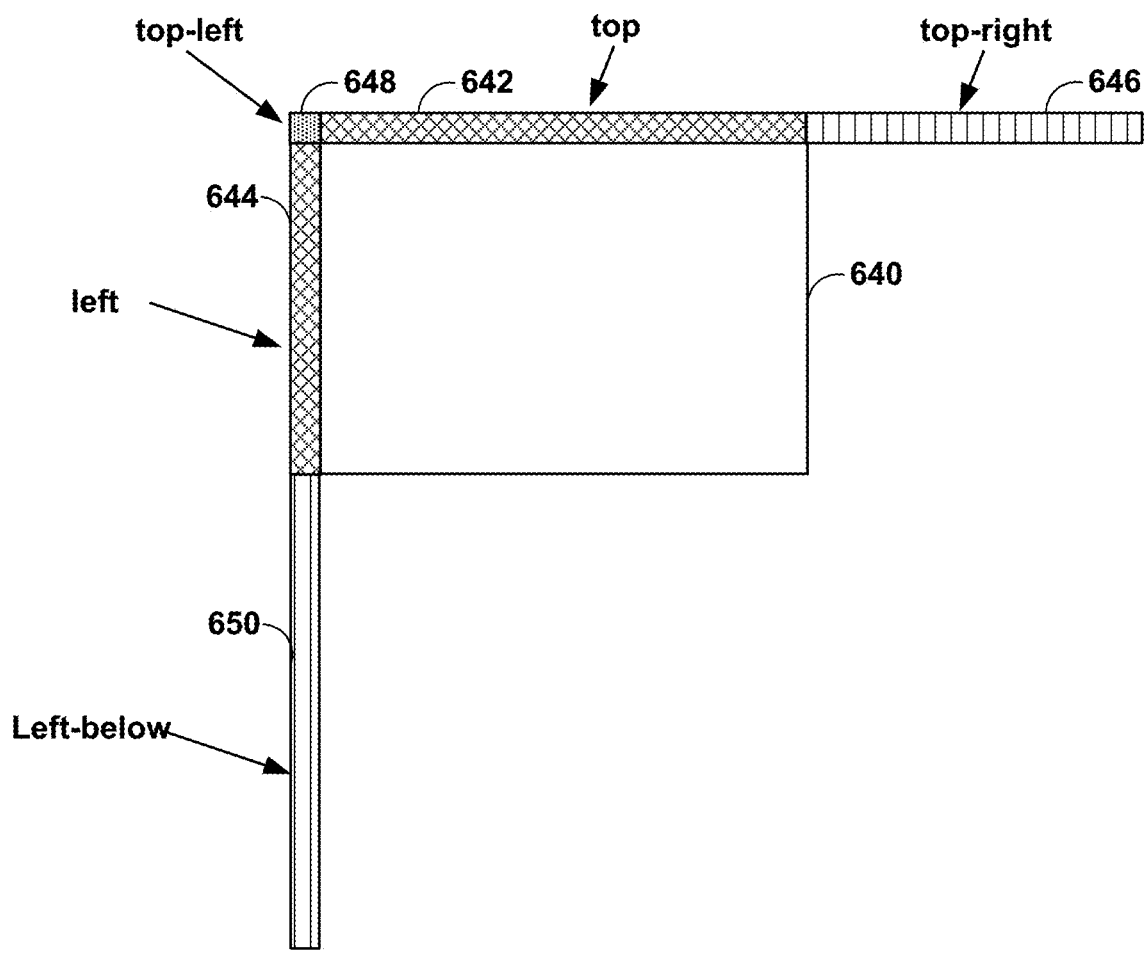
FIG. 11 is a conceptual diagram illustrating an example of a reference sample array for intra-prediction of chroma components.

FIG. 11 is a conceptual diagram illustrating reference sample array for intra-prediction of chroma components. A video coder (e.g., video encoder 200 or video decoder 300, or in some examples, mode selection unit 202 of video encoder 200 or prediction processing unit 304 of video decoder 300) may use the samples in a neighbourhood of a coding block 640 for intra prediction of the block. Typically, the video coder uses the reconstructed reference sample lines that are closest to the left and the top boundaries of coding block 640 as the reference samples for intra prediction. For example, the video coder may use reconstruction samples of a top line 642 and/or a left line 644. However, VVC also enables other samples in the neighbourhood of coding block 640 to be used as reference samples (e.g., top-left, left-below, top-right). For example, the video coder may use reconstruction samples of a top-left pixel 648, a left-below line 650, and/or a top-right line 646.

In VVC, a video coder (e.g., video encoder 200 or video decoder 300, or in some examples, mode selection unit 202 of video encoder 200 or prediction processing unit 304 of video decoder 300) may use only reference lines with MRLIdx equal to 0, 1 and 3 for the luma component. FIG.

TABLE 1

Specification of intraPredAngle

| predModeIntra | | | | | | | | | | | | | | −14 | −13 | −12 | −11 |
|---|---|---|---|---|---|---|---|---|---|---|---|---|---|---|---|---|---|
| intraPredAngle | | | | | | | | | | | | | | 512 | 341 | 256 | 171 |
| predModeIntra | −10 | −9 | −8 | −7 | −6 | −5 | −4 | −3 | −2 | −1 | 2 | 3 | 4 | 5 | 6 | 7 | 8 |
| intraPredAngle | 128 | 102 | 86 | 73 | 64 | 57 | 51 | 45 | 39 | 35 | 32 | 29 | 26 | 23 | 20 | 18 | 16 |
| predModeIntra | 9 | 10 | 11 | 12 | 13 | 14 | 15 | 16 | 17 | 18 | 19 | 20 | 21 | 22 | 23 | 24 | 25 |
| intraPredAngle | 14 | 12 | 10 | 8 | 6 | 4 | 3 | 2 | 1 | 0 | −1 | −2 | −3 | −4 | −6 | −8 | −10 |
| predModeIntra | 26 | 27 | 28 | 29 | 30 | 31 | 32 | 33 | 34 | 35 | 36 | 37 | 38 | 39 | 40 | 41 | 42 |
| intraPredAngle | −12 | −14 | −16 | −18 | −20 | −23 | −26 | −29 | −32 | −29 | −26 | −23 | −20 | −18 | −16 | −14 | −12 |
| predModeIntra | 43 | 44 | 45 | 46 | 47 | 48 | 49 | 50 | 51 | 52 | 53 | 54 | 55 | 56 | 57 | 58 | 59 |
| intraPredAngle | −10 | −8 | −6 | −4 | −3 | −2 | −1 | 0 | 1 | 2 | 3 | 4 | 6 | 8 | 10 | 12 | 14 |
| predModeIntra | 60 | 61 | 62 | 63 | 64 | 65 | 66 | 67 | 68 | 69 | 70 | 71 | 72 | 73 | 74 | 75 | 76 |
| intraPredAngle | 16 | 18 | 20 | 23 | 26 | 29 | 32 | 35 | 39 | 45 | 51 | 57 | 64 | 73 | 86 | 102 | 128 |
| predModeIntra | 77 | 78 | 79 | 80 | | | | | | | | | | | | | |
| intraPredAngle | 171 | 256 | 341 | 512 | | | | | | | | | | | | | |

11 illustrates MRLIdx equal to 0. In VVC, the video coder may predict the cross-component linear model (CCLM) chroma block from the luma reconstructed sample. In this example, for other chroma intra blocks, the video coder may predict the prediction from only the line with MRLIdx=0. For the luma, the video coder may predict the prediction using a MRLIdx of 0, 1, 2 (previously 0, 1 and 3, but in WD8, the MRLIdx is modified to be 0, 1, and 2). A video encoder (e.g., video encoder 200 may signal the MRLIdx in a bitstream.

For the chroma component, the video coder may use only the reference line with MRLIdx equal to 0 as depicted in FIG. 11. The video coder may code the index to the reference line used for coding the block (values 0, 1 and 2 indicating lines with MRLIdx 0, 1 and 3, respectively) with a truncated unary codeword. The video coder may not use planar and DC modes for the reference line with MRLIdx>0. In some examples, the video coder may add only the available samples of the neighbourhood of a coding block to the reference array for intra-prediction. Availability checking of the samples in VVC is presented in the following.

8.4.4.2.2 Reference Sample Availability Marking Process
Inputs to this process are:
    a sample location (xTbCmp, yTbCmp) specifying the top-left sample of the current transform block relative to the top left sample of the current picture,
    a variable refIdx specifying the intra prediction reference line index,
    a variable refW specifying the reference samples width,
    a variable refH specifying the reference samples height,
    a variable cIdx specifying the colour component of the current block.

Outputs of this process are the reference samples refUnfilt[x][y] with x=−1−refIdx, y=−1−refIdx . . . refH−1 and x=−refIdx . . . refW−1, y=−1−refIdx for intra sample prediction.

The refW+refH+1+(2*refIdx) neighbouring samples refUnfilt[x][y] that are constructed samples prior to the in-loop filter process, with x=−1−refIdx, y=−1−refIdx . . . refH−1 and x=−refIdx . . . refW−1, y=−1−refIdx, are derived as follows:
    The neighbouring location (xNbCmp, yNbCmp) is specified by:

$$(xNbCmp, yNbCmp)=(xTbCmp+x, yTbCmp+y) \quad (8\text{-}108)$$

The current luma location (xTbY, yTbY) and the neighbouring luma location (xNbY, yNbY) are derived as follows:

$$(xTbY, yTbY)=(cIdx==0)?(xTbCmp, yTbCmp):(xTbCmp<<1, yTbCmp<<1) \quad (8\text{-}109)$$

$$(xNbY, yNbY)=(cIdx==0)?(xNbCmp, yNbCmp):(xNbCmp<<1, yNbCmp<<1) \quad (8\text{-}110)$$

The availability derivation process for a block as specified in clause 6.4.X
    [Ed. (BB): Neighbouring blocks availability checking process tbd] is invoked with the current luma location (xCurr, yCurr) set equal to (xTbY, yTbY) and the neighbouring luma location (xNbY, yNbY) as inputs, and the output is assigned to availableN.
    Each sample refUnfilt[x][y] is derived as follows:
        If availableN is equal to FALSE, the sample refUnfilt[x][y] is marked as "not available for intra prediction".
        Otherwise, the sample refUnfilt[x][y] is marked as "available for intra prediction" and the sample at the location (xNbCmp, yNbCmp) is assigned to refUnfilt[x][y].

When the reference sample availability marking is finished, a video coder (e.g., video encoder 200 or video decoder 300, or in some examples, mode selection unit 202 of video encoder 200 or prediction processing unit 304 of video decoder 300) may obtain the unavailable sample using a reference sample substitution process as presented in the following.

8.4.4.2.3 Reference Sample Substitution Process
Inputs to this process are:
    a variable refIdx specifying the intra prediction reference line index,
    a variable refW specifying the reference samples width,
    a variable refH specifying the reference samples height,
    reference samples refUnfilt[x][y] with x=−1−refIdx, y=−1−refIdx . . . refH−1 and x=−refIdx . . . refW−1, y=−1−refIdx for intra sample prediction,
    a variable cIdx specifying the colour component of the current block.

Outputs of this process are the modified reference samples refUnfilt[x][y] with x=−1−refIdx, y=−1−refIdx . . . refH−1 and x=−refIdx . . . refW−1, y=−1−refIdx for intra sample prediction.

The variable bitDepth is derived as follows:
    If cIdx is equal to 0, bitDepth is set equal to BitDepthY
    Otherwise, bitDepth is set equal to BitDepthC.

The values of the samples refUnfilt[x][y] with x=−1−refIdx, y=−1−refIdx . . . refH−1 and x=−refIdx . . . refW−1, y=−1−refIdx are modified as follows:
    If all samples refUnfilt[x][y] with x=−1−refIdx, y=−1−refIdx . . . refH−1 and x=−refIdx . . . refW−1, y=−1−refIdx are marked as "not available for intra prediction", all values of refUnfilt[x][y] are set equal to 1<<(bitDepth−1
    Otherwise (at least one but not all samples refUnfilt[x][y] are marked as "not available for intra prediction"), the following ordered steps apply:
        1. When refUnfilt[−1−refIdx][refH−1] is marked as "not available for intra prediction", search sequentially starting from x=−1−refIdx, y=refH−1 to x=−1−refIdx, y=−1−refIdx, then from x=−refIdx, y=−1−refIdx to x=refW−1, y=−1−refIdx, for a sample refUnfilt[x][y] that is marked as "available for intra prediction". Once a sample refUnfilt[x][y] marked as "available for intra prediction" is found, the search is terminated and the value of refUnfilt[−1−refIdx][refH−1] is set equal to the value of refUnfilt[x][y].
        2. For x=−1−refIdx, y=refH−2 . . . −1−refIdx, when refUnfilt[x][y] is marked as "not available for intra prediction", the value of refUnfilt[x][y] is set equal to the value of refUnfilt[x][y+1].
        3. For x=0 . . . refW−1, y=−1, when refUnfilt[x][y] is marked as "not available for intra prediction", the value of refUnfilt[x][y] is set equal to the value of refUnfilt[x−1][y].

All samples refUnfilt[x][y] with x=−1−refIdx, y=−1−refIdx . . . refH−1 and x=−refIdx . . . refW−1, y=−1−refIdx are marked as "available for intra prediction".

In order to increase the processing throughput of intra coding, some techniques disable small block sizes, e.g., 2×2, 2×4, and 4×2 in dual tree. For a single tree, some systems may share reference samples for small blocks. When sharing reference samples for small blocks, parallel regions including several small blocks may be defined in which all the sub-blocks in the region can be processed in parallel. Although this technique can increase the worst-case processing throughput, this technique makes the prediction more complicated. The reason is that a significant change of intra prediction may be needed to decide the reference samples because the prediction may not use samples of neighbouring blocks as reference.

In some hardware video encoders and video decoders, processing throughput is reduced when a picture has more small blocks. Such processing throughput drop may come from small intra blocks or intra block copy (IBC) blocks. A reason that the throughput drop comes from small intra blocks or IBC blocks is intra blocks have data dependency between neighbouring blocks (e.g., the predictor generation of an intra block requires top and left boundary reconstructed samples from neighbouring blocks) and must be processed sequentially. In addition, the small IBC blocks may use reconstructed samples of the spatial neighbouring blocks for prediction that may lead to prediction dependency.

In HEVC, the worst-case processing throughput may occur when 4×4 chroma intra blocks are processed. In the VVC test model 4.0 (VTM 4.0), the size of the smallest intra block is 2×2, and the reconstruction process of a chroma intra block becomes very complex due to the adoption of new tools, such as, for example, but not limited to, cross-component linear model (CCLM) techniques, position dependent prediction combination (PDPC) techniques, references smoothing techniques, or other new tools.

Techniques described herein may include configuring video encoder 200 and/or video decoder 300 to enable processing of small intra-coded blocks and/or IBC blocks in parallel and thus increase the processing throughput of video encoder 200 and/or video decoder 300.

Techniques described herein may include configuring a video coder (e.g., video encoder 200 or video decoder 300, or in some examples, mode selection unit 202 of video encoder 200 or prediction processing unit 304 of video decoder 300) to include block size restriction and remove dependency between neighbouring blocks.

A video coder (e.g., video encoder 200 or video decoder 300, or in some examples, mode selection unit 202 of video encoder 200 or prediction processing unit 304 of video decoder 300) may be configured to not allow (e.g., prevent) a split that leads to small blocks (e.g., blkWidth*blkHeight<Threshold). Said differently, a video encoder (e.g., video encoder 200 or in some examples, mode selection unit 202 of video encoder 200) may be configured to partition video data into a plurality of blocks, where the partitioning comprises applying a block size restriction to prevent a splitting of a block of the plurality of blocks that would result in a small block comprising a block width and a block height when the block height times the block width is less than a threshold. A video decoder (e.g., video decoder 300 or in some examples, prediction processing unit 304 of video decoder 300) may be configured to determine a partition of video data into a plurality of blocks, where the partition applies a block size restriction to prevent a splitting of a block of the plurality of blocks that would result in a small block comprising a block width and a block height when the block height times the block width is less than a threshold. In some example, the threshold may be set to 16. As such, the video coder may be configured to restrict the blocks sizes 2×2, 2×4 and 4×2, e.g., to prevent splitting of blocks into blocks sizes 2×2, 2×4 and 4×2. In this example, the video coder may be configured to not allow quadtree-split (QT) and binary split (BT) for an 4×4 block, and triple split is restricted for 8×2 or 2×8 blocks.

A video coder (e.g., video encoder 200 or video decoder 300, or in some examples, mode selection unit 202 of video encoder 200 or prediction processing unit 304 of video decoder 300) may be configured to apply the block size restriction for only chroma components in dual tree. Said differently, a video encoder (e.g., video encoder 200, or in some examples, mode selection unit 202 of video encoder 200) may partition luma components for a block according to a luma tree of a dual tree and chroma components for the block according to a chroma tree of the dual tree. In this example, the video encoder may apply the block size restriction to only the chroma components for the block. A video decoder (e.g., video decoder 300, or in some examples, prediction processing unit 304 of video decoder 300) may determine a partition of luma components for a block according to a luma tree of a dual tree and chroma components for the block according to a chroma tree of the dual tree. In this example, the partition may apply the block size restriction to only the chroma components for the block.

A video coder (e.g., video encoder 200 or video decoder 300, or in some examples, mode selection unit 202 of video encoder 200 or prediction processing unit 304 of video decoder 300) may be configured to apply the block size restriction for both chroma components and the luma component in dual tree. Said differently, a video encoder (e.g., video encoder 200, or in some examples, mode selection unit 202 of video encoder 200) may partition luma components for a block according to a luma tree of a dual tree and chroma components for the block according to a chroma tree of the dual tree. In this example, the video encoder may apply the block size restriction to the chroma components for the block and the luma components for the block. A video decoder (e.g., video decoder 300, or in some examples, prediction processing unit 304 of video decoder 300) may determine a partition of luma components for a block according to a luma tree of a dual tree and chroma components for the block according to a chroma tree of the dual tree. In this example, the partition may apply the block size restriction to the chroma components for the block and the luma components for the block.

A video coder (e.g., video encoder 200 or video decoder 300, or in some examples, mode selection unit 202 of video encoder 200 or prediction processing unit 304 of video decoder 300) may be configured to apply the block size restriction for only the chroma component in single tree. For instance, the video coder may refrain from comparing a resulting luma block for the block to a threshold. In this example, the video coder may be configured to apply dependency removal techniques for removing dependency between neighbouring blocks of this disclosure to the chroma small block sizes.

In some examples of single tree, a split of a chroma block may be independent from a split of a luma block when this split results in small blocks which have blkWidth*blkHeight<Threshold. For example, with threshold of 16, if an 8×8/4×16/16×4 luma block is split further, the video coder may be configured to not split the corresponding chroma block. Said differently, a video encoder (e.g., video encoder 200, or in some examples, mode selection unit 202 of video encoder 200) may be configured to partition luma components for a block and chroma components for the block according to a single tree. In this example, to partition, the video encoder may split the luma components for the block and apply the block size restriction to prevent a splitting of the chroma components for the block. A video decoder (e.g., video decoder 300, or in some examples, prediction processing unit 304 of video decoder 300) may be configured to determine a partition of luma components for a block and chroma components for the block according to a single tree that splits the luma components for the block. In this example, the partition of the video data applies the block size restriction to prevent a splitting of the chroma components for the block. The luma components may form, for example, an 8×8 luma block, a 4×16 luma block, or a 16×4 luma block. Said differently, the luma components may form an 8×8 luma block, a 4×16 luma block, or a 16×4 luma block before splitting the luma components for the block. That is, when the luma components form an 8×8 luma block, a 4×16 luma block, or a 16×4 luma block before splitting the luma components for the block, the chroma block may be less than a threshold of 16 due to sub-sampled size of the chroma components (e.g., 4:2:0) while the luma block remains greater than or equal to the threshold of 16.

A video coder (e.g., video encoder 200 or video decoder 300, or in some examples, mode selection unit 202 of video encoder 200 or prediction processing unit 304 of video decoder 300) may be configured to remove a dependency between neighbouring blocks. For example, the video coder may be configured to define a parallel-processable region (PPR). The video coder may be able to process all the blocks covered by the PPR region in parallel. The video coder may be configured to set the minimum number of samples in a PPR by a threshold or a value signalled in the bitstream.

Figure 12:
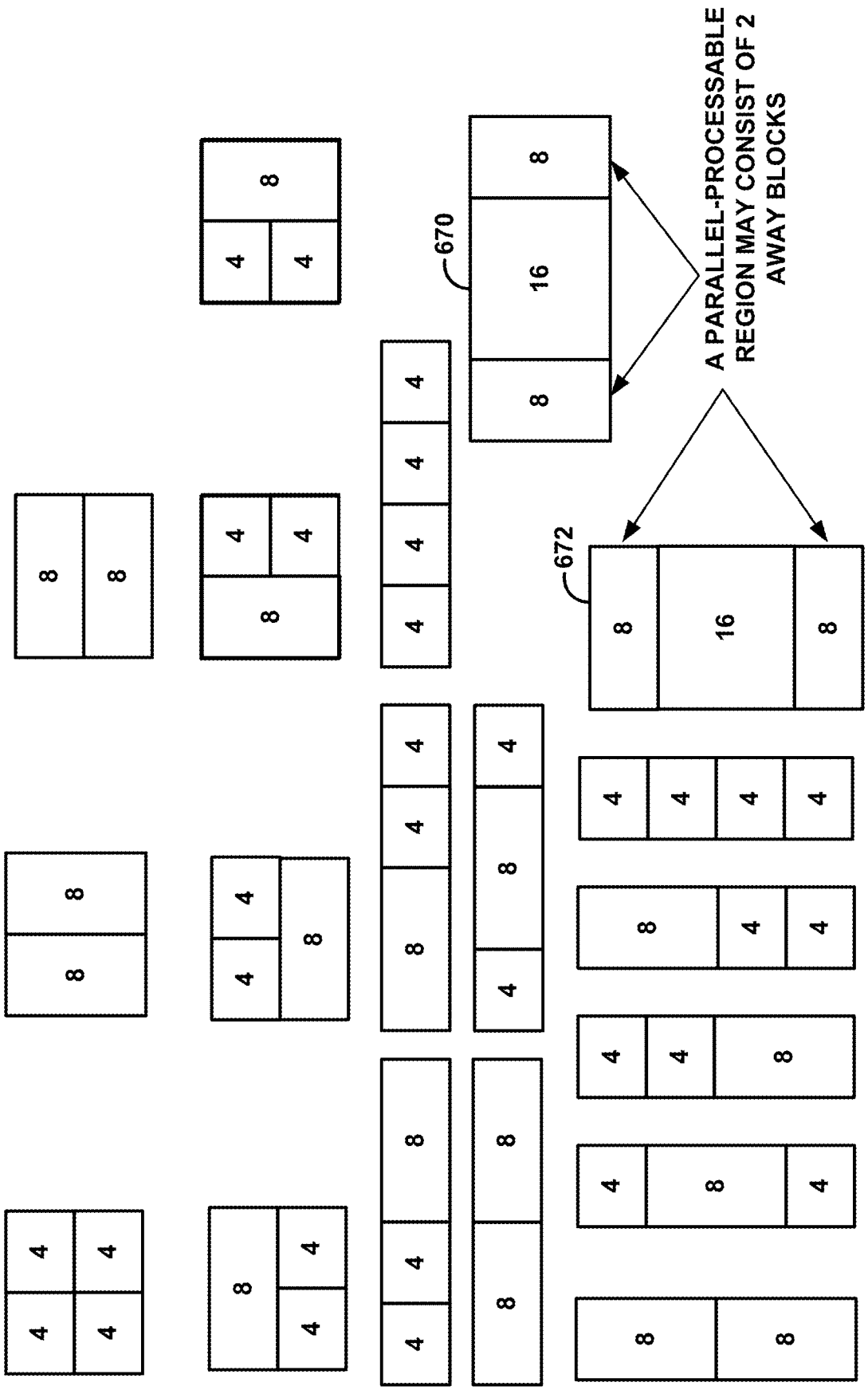
FIG. 12 is a conceptual diagram illustrating examples of parallel-processable regions (PPRs) with a size of 64 samples (16 chroma samples).

For example, if the threshold is 64, the shape of the parallel-processable region may be as in FIG. 12. FIG. 12 is a conceptual diagram illustrating examples of PPRs with the size of 64 samples (16 chroma samples). A video coder (e.g., video encoder 200 or video decoder 300, or in some examples, mode selection unit 202 of video encoder 200 or prediction processing unit 304 of video decoder 300) may be configured to define the root sample (R) of a PPR as the top-left sample of the top-left block of the region. The video coder may be configured to define the distance of the $n^{th}$ block to the root as $(dX_n, dY_n)=(X_n-X_R, Y_n-Y_R)$, where $(X_n, Y_n)$ and $(X_R, Y_R)$ are the positions of the top-left sample of the $n^{th}$ block and the root sample, respectively. dXn, dYn may represent a distance of the top-left sample of block nth to the top-left sample of a PPR (e.g., root) along a horizontal direction and along a vertical direction, respectively.

A PPR may be of rectangular shape; however, in some cases, a video coder (e.g., video encoder 200 or video decoder 300, or in some examples, mode selection unit 202 of video encoder 200 or prediction processing unit 304 of video decoder 300) may be configured to define a PPR as a union of rectangular shapes; the rectangular shapes constituting the PPR may or may not be adjacent.

In FIG. 12, two examples of PPR with non-adjacent rectangular blocks is shown. For a 4×8 block with a vertical triple split, two non-adjacent 4×2 blocks are generated and they form a PPR of 16 samples; the 4×4 block is not considered to part of the PPR. That is, the first example includes a 4×8 block 670 and the second example includes an 8×4 block 672.

A video coder (e.g., video encoder 200 or video decoder 300, or in some examples, mode selection unit 202 of video encoder 200 or prediction processing unit 304 of video decoder 300) may be configured to perform mode restriction. To remove a dependency between neighbouring blocks in a region, the video coder may be configured to limit the prediction mode candidate list of a block based on a position of the block in the parallel region.

A video coder (e.g., video encoder 200 or video decoder 300, or in some examples, mode selection unit 202 of video encoder 200 or prediction processing unit 304 of video decoder 300) may be configured to remove a prediction mode that uses the samples from the neighbour blocks of the same PPR from the candidate list. For example, for a block that has non-zero dXn, the video coder may be configured to restrict a DC prediction, a planar (PL) mode prediction, and/or a horizontal (HOR) mode prediction. The video coder may be configured to disallow derived mode (DM) if the mode of the corresponding luma area is a DC mode, a PL mode, or a HOR mode. The position-dependent prediction combination (PDPC) process may not use the samples of the left neighbouring block.

For a block that has non-zero dYn, a video coder (e.g., video encoder 200 or video decoder 300, or in some examples, mode selection unit 202 of video encoder 200 or prediction processing unit 304 of video decoder 300) may be configured to disallow a DC prediction, a PL prediction, and/or a VER prediction. The video coder may be configured to disable a DM mode if the mode of the corresponding luma area is a DC mode, a PL mode, or a vertical (VER) mode. The PDPC process may not use the samples of the above neighbouring block.

A video coder (e.g., video encoder 200 or video decoder 300, or in some examples, mode selection unit 202 of video encoder 200 or prediction processing unit 304 of video decoder 300) may be configured to allow only a DC prediction for a block which has at least one of dXn and dYn being non-zero. In this case, the video coder may be configured to not use the samples located within the PPR to calculate the DC value. When both dXn and dYn are non-zero, the video coder may be configured to use the DC mode where the DC value is set equal to a predefined value.

In case a parallel-processable region includes two separated blocks, a video coder (e.g., video encoder 200 or video decoder 300, or in some examples, mode selection unit 202 of video encoder 200 or prediction processing unit 304 of video decoder 300) may be configured to process the blocks in the PPR before the intermediate blocks that do not belong to the region. In this case, the video coder may be configured to restrict a prediction that uses the reference samples from the intermediate block.

A video coder (e.g., video encoder 200 or video decoder 300, or in some examples, mode selection unit 202 of video encoder 200 or prediction processing unit 304 of video decoder 300) may be configured to disable IBC mode for small blocks (e.g., 2×2, 2×4, 4×2).

A video coder (e.g., video encoder 200 or video decoder 300, or in some examples, mode selection unit 202 of video encoder 200 or prediction processing unit 304 of video decoder 300) may be configured to disable IBC mode for all small blocks (e.g., 2×2, 2×4, 4×2) excluding the first block in the PPR (the top-left block in the PPR).

A video coder (e.g., video encoder 200 or video decoder 300, or in some examples, mode selection unit 202 of video encoder 200 or prediction processing unit 304 of video decoder 300) may be configured to exclude all the blocks in a PPR from the IBC prediction area of other blocks in the same PPR.

A video coder (e.g., video encoder 200 or video decoder 300, or in some examples, mode selection unit 202 of video encoder 200 or prediction processing unit 304 of video decoder 300) may be configured to set the prediction samples for small IBC blocks in PPR equal to a default value. The video coder may be configured to determine the default value based on the bit-depth being used to present the samples.

A video coder (e.g., video encoder 200 or video decoder 300, or in some examples, mode selection unit 202 of video encoder 200 or prediction processing unit 304 of video decoder 300) may be configured to clip the motion vector of small chroma blocks in PPR such that the reference block does not overlap the PPR.

A video coder (e.g., video encoder 200 or video decoder 300, or in some examples, mode selection unit 202 of video encoder 200 or prediction processing unit 304 of video decoder 300) may be configured to remove one or more samples from a reference samples array that make neighbouring blocks dependent. For example, the video coder may be configured to mark a block in a PPR as "unavailable" for intra prediction of other blocks within the same PPR. For instance, the video coder may be configured to not use the samples of the block within the parallel-processable region for others blocks in the same PPR. In this case, the video coder may be configured to substitute a prediction that refers to unavailable samples by a value.

The availability of neighbour block checking for intra prediction of a block may be based on the block's position in the PPR. If a block has non-zero dXn, a video coder (e.g., video encoder 200 or video decoder 300, or in some examples, mode selection unit 202 of video encoder 200 or prediction processing unit 304 of video decoder 300) may be configured to mark the left and the left-below blocks as unavailable. If a block has non-zero dYn, the video coder may be configured to mark the top and top-right blocks as unavailable. If both dXn and dYn of a block are non-zero, the video coder may be configured to mark the left-below, left, top-left, top, and top-right blocks as unavailable. Again, a prediction that refers to unavailable samples may be substituted by a value.

In VVC, a video coder (e.g., video encoder 200 or video decoder 300, or in some examples, mode selection unit 202 of video encoder 200 or prediction processing unit 304 of video decoder 300) may be configured to check the availability of reference samples by modifying the reference sample availability marking process (e.g., Clause 8.4.4.2.2) as shown below for PPRs with minimum samples of 16 chroma samples (64 luma samples).

A video coder (e.g., video encoder 200 or video decoder 300, or in some examples, mode selection unit 202 of video encoder 200 or prediction processing unit 304 of video decoder 300) may be configured to apply the dependent reference sample removal for the chroma components in both single tree and dual tree. The video coder may be configured to restrict the small chroma blocks in dual tree while the dependent removal may be applied for the chroma components in single tree.

A video coder (e.g., video encoder 200 or video decoder 300, or in some examples, mode selection unit 202 of video encoder 200 or prediction processing unit 304 of video decoder 300) may be configured to apply the dependent removal for both the chroma component and luma component.

8.4.4.2.2 Reference Sample Availability Marking Process

Inputs to this process are:
  a sample location (xTbCmp, yTbCmp) specifying the top-left sample of the current transform block relative to the top left sample of the current picture,
  a variable refIdx specifying the intra prediction reference line index,
  a variable refW specifying the reference samples width,
  a variable refH specifying the reference samples height,
  a variable cIdx specifying the colour component of the current block,
  a sample location (XR, YR) specifying the luma root location of the PPR,
  a variable curW specifying the width of the current transform block,
  a variable curH specifying the height of the current transform block.

Outputs of this process are the reference samples refUnfilt[x][y] with x=−1−refIdx, y=−1−refIdx . . . refH−1 and x=−refIdx . . . refW−1, y=−1−refIdx for intra sample prediction.

The refW+refH+1+(2*refIdx) neighbouring samples refUnfilt[x][y] that are constructed samples prior to the in-loop filter process, with x=−1−refIdx, y=−1−refIdx . . . refH−1 and x=−refIdx . . . refW−1, y=−1−refIdx, are derived as follows:

The neighbouring location (xNbCmp, yNbCmp) is specified by:

$$(xNbCmp, yNbCmp) = (xTbCmp+x, yTbCmp+y) \quad (8\text{-}108)$$

The current luma location (xTbY, yTbY) and the neighbouring luma location (xNbY, yNbY) are derived as follows:

$$(xTbY, yTbY) = (cIdx==0)?(xTbCmp, yTbCmp) : (xTbCmp<<1, yTbCmp<<1) \quad (8\text{-}109)$$

$$(xNbY, yNbY) = (cIdx==0)?(xNbCmp, yNbCmp) : (xNbCmp<<1, yNbCmp<<1) \quad (8\text{-}110)$$

The distance (dXn, dYn) between current luma location (xTbY, yTbY) and the luma root location of PPR are derived as follows:

$$dXn = xTbY - XR$$

$$dYn = yTbY - YR$$

An availability variable isRestricted specifying whether the dependency among the current block and other blocks in the same PPR occurred is derived as follows:

$$\text{isRestricted} = (dXn!=0 || dYn!=0) \&\& (curW*curH<16) \&\& cIdx!=0$$

The availability derivation process for a block as specified in clause 6.4.X [Ed. (BB): Neighbouring blocks availability checking process tbd] is invoked with the current luma location (xCurr, yCurr) set equal to (xTbY, yTbY) and the neighbouring luma location (xNbY, yNbY) as inputs, and the output is assigned to availableN.

If isRestricted is equal to TRUE, availableN is updated as follows:
  If dXn !=0 && dYn !=0, availableN is set equal to FALSE,
  If dXn !=0 && dYn==0, and x=−1−refIdx, y=0 . . . refH−1, availableN is set equal to FALSE,
  If dYn !=0 && dXn==0, and x=0 . . . refW−1, y=−1−refIdx, availableN is set equal to FALSE.

Each sample refUnfilt[x][y] is derived as follows:
  If availableN is equal to FALSE, the sample refUnfilt[x][y] is marked as "not available for intra prediction".
  Otherwise, the sample refUnfilt[x][y] is marked as "available for intra prediction" and the sample at the location (xNbCmp, yNbCmp) is assigned to refUnfilt[x][y].

When a reference sample of a block in the PPR is not available, a video coder (e.g., video encoder 200 or video decoder 300, or in some examples, mode selection unit 202 of video encoder 200 or prediction processing unit 304 of video decoder 300) may be configured to substitute this unavailable sample as follows.

A video coder (e.g., video encoder 200 or video decoder 300, or in some examples, mode selection unit 202 of video encoder 200 or prediction processing unit 304 of video decoder 300) may be configured to set the unavailable sample equal to a predefined value. This predefined value may be also based on the bit-depth being used to present the samples.

A video coder (e.g., video encoder 200 or video decoder 300, or in some examples, mode selection unit 202 of video encoder 200 or prediction processing unit 304 of video decoder 300) may be configured to set the unavailable sample equal to the average of the reconstructed samples along the border of the PPR.

A video coder (e.g., video encoder 200 or video decoder 300, or in some examples, mode selection unit 202 of video encoder 200 or prediction processing unit 304 of video decoder 300) may be configured to set this unavailable sample equal to the value of the bottom-right sample of the top-left neighbouring block. In the example, the top-left neighbouring block and the current block share the same PPR and the video coder may be configured to set this value equal to a predefined value that may be based on the bit-depth being used to present the samples.

In case a PPR includes two separated blocks, a video coder (e.g., video encoder 200 or video decoder 300, or in some examples, mode selection unit 202 of video encoder 200 or prediction processing unit 304 of video decoder 300) may be configured to process the blocks in this PPR before processing the intermediate blocks that do not belong to the region. In this example, if a prediction refers to a sample of the intermediate block, the video coder may be configured to set the predicted value equal to a predefined value.

A video coder (e.g., video encoder 200 or video decoder 300, or in some examples, mode selection unit 202 of video encoder 200 or prediction processing unit 304 of video decoder 300) may be configured to replace the reference samples by the value of the bottom-right sample of the top-left neighbouring block or the DC value when dXn and dYn are non-zero.

A video coder (e.g., video encoder 200 or video decoder 300, or in some examples, mode selection unit 202 of video encoder 200 or prediction processing unit 304 of video decoder 300) may be configured to fill the values of unavailable samples by the reference sample substitution process defined in the specification, e.g., Clause 8.4.4.2.3 Reference sample substitution process of VVC WD4.

Figure 13:
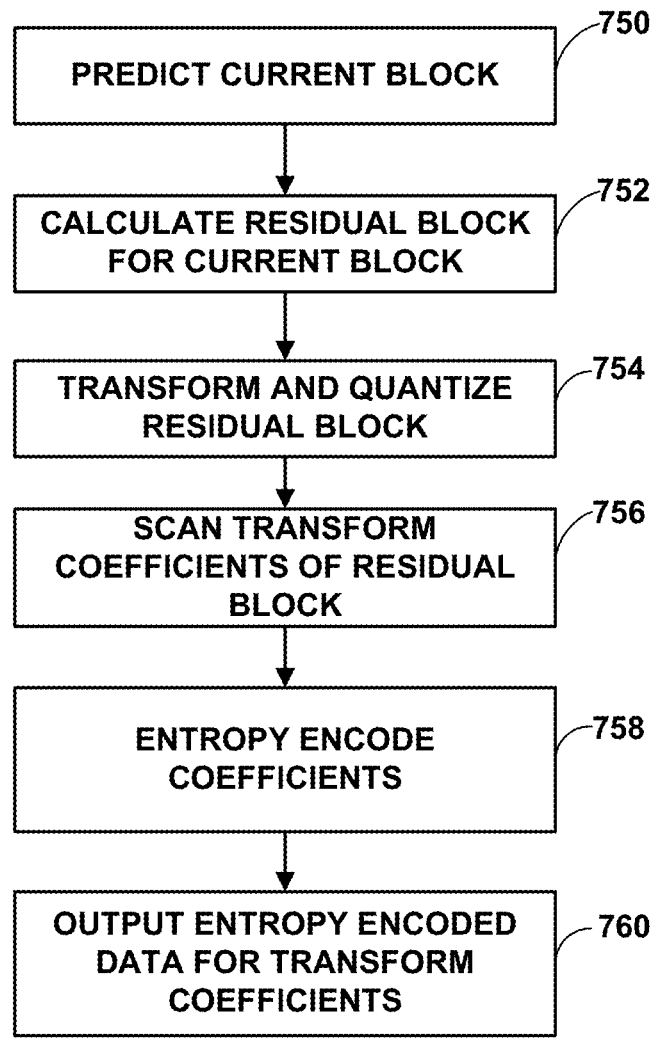
FIG. 13 is a flowchart illustrating an example method for encoding a current block.

FIG. 13 is a flowchart illustrating an example method for encoding a current block. The current block may comprise a current CU. Although described with respect to video encoder 200 (FIGS. 1 and 3), other devices may be configured to perform a method similar to that of FIG. 13.

Mode selection unit 202 initially predicts the current block (750). For example, mode selection unit 202 may form a prediction block for the current block using intra prediction, inter prediction, or another coding mode. Mode selection unit 202 may partition video data using a block size restriction. For example, mode selection unit 202 may apply a block size restriction to prevent a splitting of a block that would result in a small block comprising a block width and a block height when the block height times the block width is less than a threshold (e.g., 16). Residual generation unit 204 may then calculate a residual block for the current block (752). To calculate the residual block, residual generation unit 204 may calculate a difference between the original, uncoded block and the prediction block for the current block. Transform processing unit 206 and quantization unit 208 may transform and quantize coefficients of the residual block (754). Entropy encoding unit 220 may scan the quantized transform coefficients of the residual block (756). During the scan, or following the scan, entropy encoding unit 220 may entropy encode the transform coefficients (758). For example, entropy encoding unit 220 may encode the transform coefficients using CAVLC or CABAC. Entropy encoding unit 220 may then output the entropy encoded data of the block (760).

Figure 14:
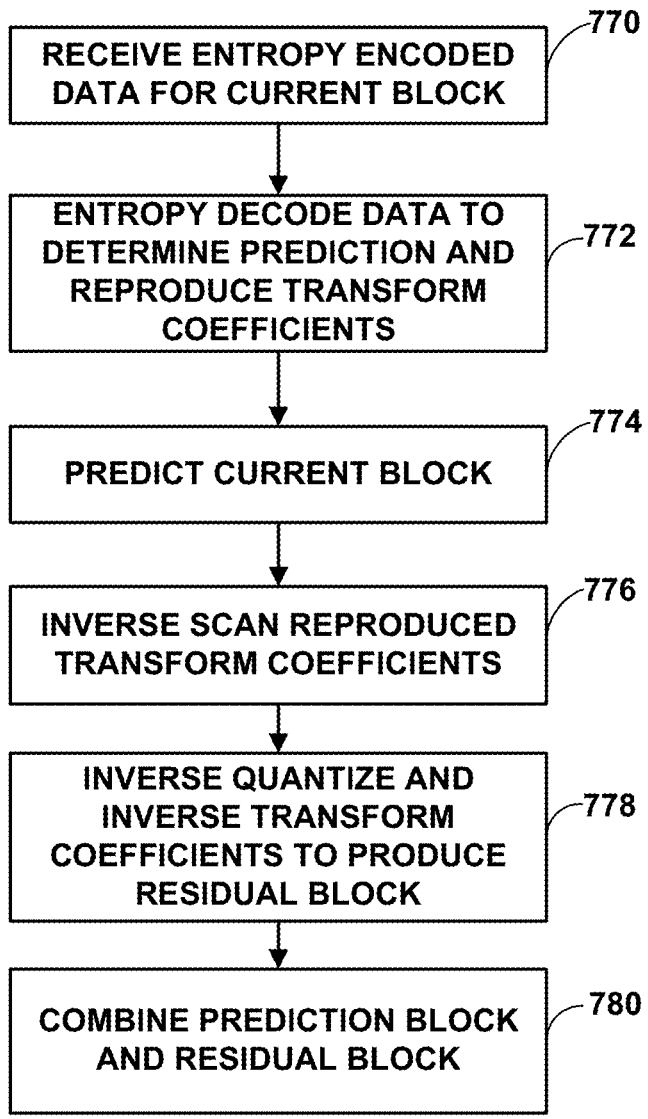
FIG. 14 is a flowchart illustrating an example method for decoding a current block of video data.

FIG. 14 is a flowchart illustrating an example method for decoding a current block of video data. The current block may comprise a current CU. Although described with respect to video decoder 300 (FIGS. 1 and 4), other devices may be configured to perform a method similar to that of FIG. 14.

Entropy decoding unit 302 may receive entropy encoded data for the current block, such as entropy coded prediction information and entropy coded data for transform coefficients of a residual block corresponding to the current block (770). Entropy decoding unit 302 may entropy decode the entropy encoded data to determine prediction information for the current block and to reproduce transform coefficients of the residual block (772). Prediction processing unit 304 may predict the current block (774), e.g., using an intra- or inter-prediction mode as indicated by the prediction information for the current block, to calculate a prediction block for the current block. Prediction processing unit 304 may determine a partitioning of video data using a block size restriction. For example, prediction processing unit 304 may apply a block size restriction to determine a partition that prevents a splitting of a block that would result in a small block comprising a block width and a block height when the block height times the block width is less than a threshold (e.g., 16 samples). Entropy decoding unit 302 may inverse scan the reproduced transform coefficients (776) to create a block of quantized transform coefficients. Inverse quantization unit 306 and inverse transform processing unit 308 may inverse quantize and inverse transform the coefficients to produce a residual block (778). Reconstruction unit 310 may ultimately decode the current block by combining the prediction block and the residual block (780).

Figure 15:
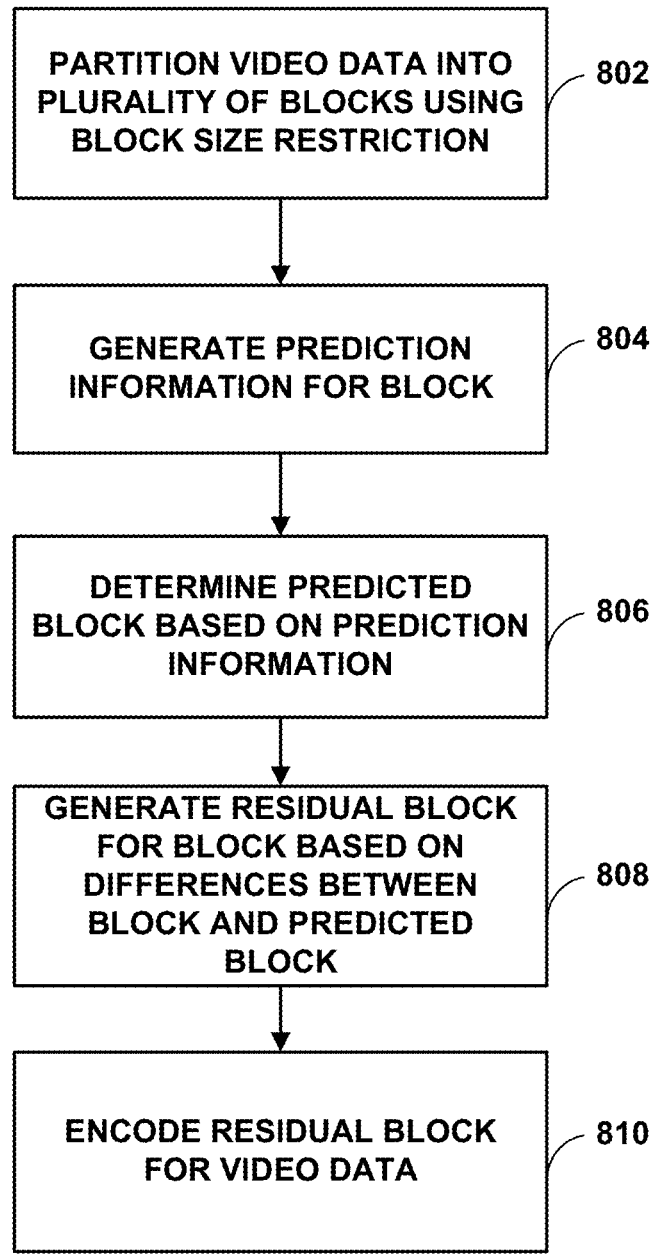
FIG. 15 is a flowchart illustrating an example method for encoding a block using a block size restriction.

FIG. 15 is a flowchart illustrating an example method for encoding a block using a block size restriction. Although described with respect to video encoder 200 (FIGS. 1 and 3), other devices may be configured to perform a method similar to that of FIG. 15.

Mode selection unit 202 may partition video data into a plurality of blocks using a block size restriction (802). For example, mode selection unit 202 may apply a block size restriction to prevent a splitting of a block of the plurality of blocks that would result in a small block comprising a block width and a block height when the block height times the block width is less than a threshold (e.g., 16). For instance, mode selection unit 202 may check various partitions and coding modes for rate-distortion only if the resulting partition satisfies the block size restriction (e.g., a splitting of a block of the plurality of blocks that would not result in a small block comprising a block width and a block height when the block height times the block width is less than a threshold). In some examples, mode selection unit 202 may apply the block size restriction to prevent a splitting of only chroma components for the block (and allow or permit a splitting of luma components for the block). By preventing splits that lead to relatively small block sizes, mode selection unit 202 may determine the prediction information of blocks of a slice of video data with fewer block dependencies, thus potentially decreasing coding complexity with little to no loss in prediction accuracy.

Mode selection unit 202 may generate prediction information for the block (804). Mode selection unit 202 may generate a predicted block based on the prediction information (806). Residual generation unit 204 may generate a residual block for the block based on differences between the block and the predicted block (808). Entropy encoding unit 220 may encode the residual block in the bitstream for the video data (810).

Figure 16:
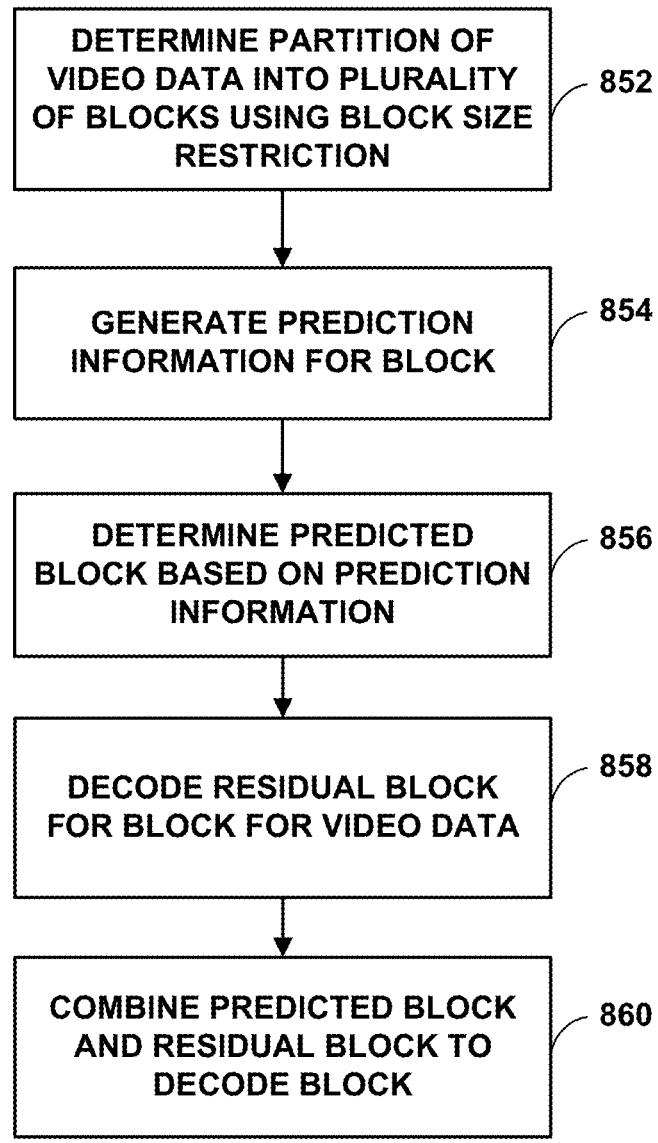
FIG. 16 is a flowchart illustrating an example method for decoding a block using a block size restriction.

FIG. 16 is a flowchart illustrating an example method for decoding a current block of video data using a block size restriction. Although described with respect to video decoder 300 (FIGS. 1 and 4), other devices may be configured to perform a method similar to that of FIG. 16.

Prediction processing unit 304 may determine a partition of video data into a plurality of blocks using a block size restriction (852). The partition may apply a block size restriction to prevent a splitting of a block of the plurality of blocks that would result in a small block comprising a block width and a block height when the block height times the block width is less than a threshold (e.g., 16). In some examples, the partition may apply the block size restriction to prevent a splitting of only chroma components for the block. By preventing splits that lead to relatively small block sizes, prediction processing unit 304 may determine the prediction information of blocks of a slice of video data with fewer block dependencies, thus potentially decreasing coding complexity with little to no loss in prediction accuracy.

Prediction processing unit 304 may generate prediction information for the block (854). Prediction processing unit 304 may generate a predicted block based on the prediction information (856). Entropy decoding unit 302 may decode a residual block for the block from the bitstream for the video data (858). Reconstruction unit 310 may combine the predicted block and the residual block to decode the block (860).

A non-limiting illustrative list of examples of the disclosure are described below.

Example 1: A method of processing video data, the method comprising: determining, by a video coder, a plurality of intra-coded blocks for generating prediction information; and processing, by a video coder, the plurality of intra-coded blocks in parallel to generate prediction information for a current block.

Example 2: The method of example 1, wherein determining the plurality of intra-coded blocks comprises applying a block size restriction to the plurality of intra-coded blocks.

Example 3: The method of any combination of examples 1-2, further comprising: coding the one or more neighboring blocks of the intra-coded blocks without dependence between the one or more neighboring blocks.

Example 4: The method of example 3, wherein coding the one or more neighboring blocks comprises selecting the one or more neighboring blocks based on a parallel-processable region.

Example 5: The method of any combination of examples 3-4, wherein coding the one or more neighboring blocks comprises limiting the intra prediction mode candidate list of a block of the plurality of intra-coded blocks based on a position of the block in the parallel region.

Example 6: The method of any combination of examples 1-5, wherein processing the plurality of intra-coded blocks in parallel comprises removing a sample for the reference samples array that make neighboring blocks of the plurality of intra-coded blocks dependent.

Example 7: The method of any combination of examples 1-6, wherein processing the plurality of intra-coded blocks in parallel comprises: disabling IBC mode for small blocks.

Example 8: The method of any combination of examples 1-7, wherein processing the plurality of intra-coded blocks in parallel comprises: disabling IBC mode for small blocks excluding the first block in the PPR.

Example 9: The method of any combination of examples 7-8, wherein small blocks comprises a block size of 2×2, 2×4, or 4×2.

Example 10: The method of any combination of claims 1-9, wherein processing the plurality of intra-coded blocks in parallel comprises: excluding all the blocks in a PPR from the IBC prediction area of other blocks in the same PPR.

Example 11: The method of any combination of claims 1-10, wherein processing the plurality of intra-coded blocks in parallel comprises: setting the prediction samples for small IBC blocks in PPR equal to a default value.

Example 12: The method of any combination of examples 1-12, wherein processing the plurality of intra-coded blocks in parallel comprises: determining the default value based on the bit-depth being used to present the samples.

Example 13: The method of any combination of examples 1-13, wherein processing the plurality of intra-coded blocks in parallel comprises: clipping the motion vector of small chroma blocks in PPR such that the reference block should not overlap the PPR.

Example 14: A device for coding video data, the device comprising one or more means for performing the method of any of examples 1-13.

Example 15: The device of example 14, wherein the one or more means comprise one or more processors implemented in circuitry.

Example 16: The device of any of examples 14-15, further comprising a memory to store the video data.

Example 17: The device of any of examples 14-16, further comprising a display configured to display decoded video data.

Example 18: The device of any of examples 14-17, wherein the device comprises one or more of a camera, a computer, a mobile device, a broadcast receiver device, or a set-top box.

Example 19: The device of any of examples 14-18, wherein the device comprises a video decoder.

Example 20: The device of any of examples 7-19, wherein the device comprises a video encoder.

Example 21: A computer-readable storage medium having stored thereon instructions that, when executed, cause one or more processors to perform the method of any of examples 1-13.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining, by one or more processors implemented in circuitry, according to a single tree partitioning scheme, a partition of both a luma block associated with a block and a chroma block associated with the block, the single tree partitioning scheme indicating both a splitting of the luma block associated with the block and a splitting of the chroma block associated with the block, wherein the single tree partitioning scheme applies a block size restriction to prevent the splitting of the chroma block associated with the block that would result in a plurality of chroma blocks where each chroma block of the plurality of chroma blocks comprises a block width and a block height where the block height times the block width is less than a threshold;
    based on the block size restriction, determining, by the one or more processors, not to split the chroma block according to the single tree partitioning scheme and splitting, by the one or more processors, the luma block into a plurality of luma blocks according to the single tree partitioning scheme;
    generating, by the one or more processors, prediction information for the block based on the chroma block and the plurality of luma blocks;
    determining, by the one or more processors, a predicted block for the block based on the prediction information;
    decoding, by the one or more processors, a residual block for the block; and
    combining, by the one or more processors, the predicted block and the residual block to decode the block.

2. The method of claim 1, wherein the threshold is 16.

3. The method of claim 1, wherein the chroma block comprises 16 samples.

4. A method of encoding video data, the method comprising:
    partitioning, by one or more processors implemented in circuitry, according to a single tree partitioning scheme, both a luma block associated with a block and a chroma block associated with the block, the single tree partitioning scheme indicating both a splitting of the luma block associated with the block and a splitting of the chroma block associated with the block, wherein the partitioning comprises applying a block size restriction to prevent the splitting of the chroma block associated with the block that would result in a plurality of chroma blocks where each chroma block of the plurality of chroma blocks comprises a block width and a block height where the block height times the block width is less than a threshold;
    based on the block size restriction, determining, by the one or more processors, not to split the chroma block according to the single tree partitioning scheme and splitting, by the one or more processors, the luma block into a plurality of luma blocks according to the single tree partitioning scheme;
    generating, by the one or more processors, prediction information for the block based on the chroma block and the plurality of luma blocks;
    determining, by the one or more processors, a predicted block for the block based on the prediction information;
    generating, by the one or more processors, a residual block for the block based on differences between the block and the predicted block; and
    encoding, by the one or more processors, the residual block.

5. The method of claim 4, wherein the threshold is 16.

6. The method of claim 4, wherein the chroma block comprises 16 samples.

7. A device for decoding video data, the device comprising:
- a memory configured to store video data; and
- one or more processors implemented in circuitry and configured to:
  - determine, according to a single tree partitioning scheme, a partition of both a luma block associated with a block and a chroma block associated with the block, the single tree partitioning scheme indicating both a splitting of the luma block associated with the block and a splitting of the chroma block associated with the block, wherein the single tree partitioning scheme applies a block size restriction to prevent the splitting of the chroma block associated with the block that would result in a plurality of chroma blocks where each chroma block of the plurality of chroma blocks comprises a block width and a block height where the block height times the block width is less than a threshold;
  - based on the block size restriction, determine not to split the chroma block according to the single tree partitioning scheme and split the luma block into a plurality of luma blocks according to the single tree partitioning scheme;
  - generate prediction information for the block based on the chroma block and the plurality of luma blocks;
  - determine a predicted block for the block based on the prediction information;
  - decode a residual block for the block; and
  - combine the predicted block and the residual block to decode the block.

8. The device of claim 7, wherein the threshold is 16.

9. The device of claim 7, wherein the chroma block comprises 16 samples.

10. A device for encoding video data, the device comprising:
- a memory configured to store video data; and
- one or more processors implemented in circuitry and configured to:
  - partition, according to a single tree partitioning scheme, both a luma block associated with a block and a chroma block associated with the block, the single tree partitioning scheme indicating both a splitting of the luma block associated with the block and a splitting of the chroma block associated with the block, wherein, to partition, the one or more processors are configured to apply a block size restriction to prevent the splitting of the chroma block associated with the block that would result in a plurality of chroma blocks where each chroma block of the plurality of chroma blocks comprises a block width and a block height where the block height times the block width is less than a threshold;
  - based on the block size restriction, determine not to split the chroma block according to the single tree partitioning scheme and split the luma block into a plurality of luma blocks according to the single tree partitioning scheme;
  - generate prediction information for the block based on the chroma block and the plurality of luma blocks;
  - determine a predicted block for the block based on the prediction information;
  - generate a residual block for the block based on differences between the block and the predicted block; and
  - encode the residual block.

11. The device of claim 10, wherein the threshold is 16.

12. The device of claim 10, wherein the chroma block comprises 16 samples.

* * * * *